US011302176B2

(12) United States Patent
Morgan et al.

(10) Patent No.: US 11,302,176 B2
(45) Date of Patent: *Apr. 12, 2022

(54) REAL TIME MUNICIPAL IMMINENT DANGER WARNING SYSTEM

(71) Applicants: Timothy E Morgan, Pickens, SC (US); Hobey Tam, Clemson, SC (US)

(72) Inventors: Timothy E Morgan, Pickens, SC (US); Hobey Tam, Clemson, SC (US)

(73) Assignees: Timothy E. Morgan, Pickens, SC (US); Patricia W. Morgan, Pickens, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,982

(22) Filed: Nov. 9, 2020

(65) Prior Publication Data

US 2021/0104149 A1 Apr. 8, 2021

Related U.S. Application Data

(63) Continuation-in-part of application No. 15/869,454, filed on Jan. 12, 2018, now Pat. No. 10,832,561, (Continued)

(51) Int. Cl.
| | | |
|---|---|---|
| G08B 27/00 | (2006.01) | |
| H04W 4/90 | (2018.01) | |
| H04W 4/029 | (2018.01) | |
| H04W 4/021 | (2018.01) | |
| G08G 1/0967 | (2006.01) | |
| G08G 1/0965 | (2006.01) | |
| G08G 1/005 | (2006.01) | |

(52) U.S. Cl.
CPC ......... *G08B 27/006* (2013.01); *G08B 27/005* (2013.01); *G08G 1/005* (2013.01); *G08G 1/0965* (2013.01); *G08G 1/096716* (2013.01); *G08G 1/096741* (2013.01); *G08G 1/096775* (2013.01); *G08G 1/096791* (2013.01); *H04W 4/021* (2013.01); *H04W 4/029* (2018.02); *H04W 4/90* (2018.02)

(58) Field of Classification Search
CPC .............. G08B 27/006; G08B 27/005; G08B 1/096741; G08B 1/096775; G08B 1/0965; G08B 1/096791; G08B 1/096716; G08B 1/005; H04W 4/90; H04W 4/021; H04W 4/02; H04W 4/029
See application file for complete search history.

(56) References Cited

U.S. PATENT DOCUMENTS 5,307,060 A * 4/1994 Prevulsky ............ G08G 1/0965
340/436
5,801,646 A * 9/1998 Pena .................... G08G 1/0965
340/331

(Continued)

*Primary Examiner* — Ojiako K Nwugo
(74) *Attorney, Agent, or Firm* — Thrive IP

(57) ABSTRACT

An apparatus and method is provided in which instant emergency alerts can be sent to programmed personal electronic devices by government officials either by a 911 call center or from a government vehicle. The apparatus and method is designed to warn people in imminent danger of a situation that may be occurring within a given geographic area. Such events include high speed police pursuits, emergency response, and fire response.

12 Claims, 34 Drawing Sheets

Related U.S. Application Data which is a continuation-in-part of application No. PCT/US2016/055663, filed on Oct. 6, 2016.

(60) Provisional application No. 62/237,849, filed on Oct. 6, 2015.

(56) References Cited

U.S. PATENT DOCUMENTS

| | | | | |
|---|---|---|---|---|
| 5,933,093 | A * | 8/1999 | Austin, II | G08G 1/0965 340/902 |
| 6,252,521 | B1 * | 6/2001 | Griffin | G08G 1/0965 340/384.1 |
| 6,377,172 | B1 * | 4/2002 | Neer | G08B 7/06 340/12.39 |
| 6,945,103 | B1 * | 9/2005 | Lee | B60C 23/0408 73/146.5 |
| 6,958,707 | B1 * | 10/2005 | Siegel | G08G 1/087 340/435 |
| 8,454,528 | B2 * | 6/2013 | Yuen | G01S 13/583 600/534 |
| 9,224,294 | B1 * | 12/2015 | St. John | G08G 1/0965 |
| 9,399,150 | B1 * | 7/2016 | Almutairi | G01L 5/0052 |
| 2001/0038344 | A1 * | 11/2001 | Garcia | G08G 1/0965 340/902 |
| 2002/0024437 | A1 * | 2/2002 | Neer | G08B 7/06 340/540 |
| 2003/0193407 | A1 * | 10/2003 | Russell | G08G 1/0965 340/902 |
| 2004/0136547 | A1 * | 7/2004 | Anderson, Jr. | H04N 21/236 381/102 |
| 2005/0057344 | A1 * | 3/2005 | Davis | G08G 1/205 340/425.5 |
| 2007/0216539 | A1 * | 9/2007 | D'Antoni | G08G 1/0965 340/902 |
| 2011/0231055 | A1 * | 9/2011 | Knight | G07C 5/008 701/31.4 |
| 2013/0166385 | A1 * | 6/2013 | Russell | G06F 16/9537 705/14.58 |
| 2014/0188607 | A1 * | 7/2014 | Yang | G06Q 30/0267 705/14.53 |
| 2015/0234570 | A1 * | 8/2015 | Hampson | G06Q 10/109 715/753 |
| 2015/0371539 | A1 * | 12/2015 | Hawkins, Sr. | G08G 1/0965 340/902 |
| 2017/0078726 | A1 * | 3/2017 | Shen | H04N 21/2668 |
| 2017/0101054 | A1 * | 4/2017 | Dusane | G08G 1/205 |
| 2017/0124842 | A1 * | 5/2017 | Sinha | G07F 9/0235 |
| 2017/0213445 | A1 * | 7/2017 | Kusens | G08B 25/016 |
| 2017/0229018 | A1 * | 8/2017 | Levy | G08G 1/096816 |

* cited by examiner

| USER NAME | KEY | SHIFT HOURS (WEEKLY AVG.) | PURSUIT NO. (WEEKLY AVG.) | AVG. PURSUIT DISTANCE (MILES) | AVG. TOP SPEED (MPH) | AVG. CIVILIAN PINGS | | |
|---|---|---|---|---|---|---|---|---|
| OCONEE1 | OCONEE1 | 32.90 | 6.63 | 6.65 | 44.49 | 403.00 | UPDATE | DELETE |
| OCONEE2 | OCONEE2 | 11.73 | 2.50 | 5.40 | 46.80 | 5.00 | UPDATE | DELETE |
| OCONEE3 | OCONEE3 | 14.97 | 5.20 | 2.41 | 662.87 | 135.00 | UPDATE | DELETE |
| OCONEE4 | OCONEE4 | 15.00 | 3.00 | 4.83 | 20.17 | 5.00 | UPDATE | DELETE |

FIG. 13

| | | | | |
|---|---|---|---|---|
| • OCONEE4 OCONEE4 | 15.00 | 3.00 | 4.83 | 20.17 | 5.00 | ⌀UPDATE ▪DELETE |
| • OCONEE5 OCONEE5 | 28.61 | 14.20 | 4.10 | 37.80 | 157.00 | ⌀UPDATE ▪DELETE |
| • OCONEE6 OCONEE6 | 7.82 | 2.50 | 4.40 | 53.20 | | ⌀UPDATE ▪DELETE |
| • OCONEE7 OCONEE7 | 12.34 | 1.50 | 1.00 | 12.33 | 2.00 | ⌀UPDATE ▪DELETE |
| • OCONEE8 OCONEE8 | 12.55 | 2.00 | 16.25 | 64.00 | 5.00 | ⌀UPDATE ▪DELETE |

SHIFT# 4
START: JUN 05, 07:19 AM
END:                                    1.00      12.00     54.00      0.00      ▯DETAILS

SHIFT# 3
START: JUN 01, 07:47 AM
END:    JUN 01, 07:36 PM    11.62      3.00      17.67     72.00      5.00      ▯DETAILS

SHIFT# 2
START: JUN 01, 12:40 AM
END:    JUN 01, 01:07 AM    10.45      0.00                                      ▯DETAILS

SHIFT# 1
START: JUN 01, 12:15 AM
END:    JUN 01, 12:31 AM    0.27       0.00

TOTAL AVG.    137.12    37.53     47.05    117.71    712.00

FIG. 14

Create/edit alert templates

| Message in push alert | Alert radius | Alert duration | Alert audible tone |
|---|---|---|---|
| [custom message] | [radius in miles] | [duration in minutes] | [upload mp3 or defaults to general tone] |

- Wrong way driver
- Drunk driver
- Wreck
- Child abduction
- Lost dog
- Adverse event
- Custom template

FIGURE 29

Create/edit alert templates

| Message in push alert | Alert radius | Alert duration | Alert audible tone |
| [custom message] | [radius in miles] | [duration in minutes] | [upload mp3 or defaults to general tone] |

- Wrong way driver
- Drunk driver
- Wreck
- Child abduction
- Lost dog
- Adverse event
- Custom template Save [new preset name]

FIGURE 30

Create/edit alert templates

| Message in push alert | Alert radius | Alert duration | Alert audible tone |

- Wrong way driver
- Drunk driver
- Wreck
- Child abduction
- Lost dog
- Adverse event
- [enter new alert name] [custom message] [radius in miles] [duration in minutes] [upload mp3 or defaults to general tone]

FIGURE 31

Create/edit alert templates

| Message in push alert | Alert radius | Alert duration | Alert audible tone |

- Wrong way driver
- Drunk driver
- Wreck
- Child abduction
- Lost dog
- Adverse event

[enter new alert name] [custom message] [radius in miles] [duration in minutes] [upload mp3 or defaults to general tone]

Save [new preset name]

FIGURE 32

| Filter settings | | | | | | |
|---|---|---|---|---|---|---|
| Date | Alert type | Start | Stop | Duration (minutes) | Civilians notified | Initiator |
| 2020 Jan 1 | Wrong way driver | 0101 | 0105 | 4.5 | 5239 | tim |
| 2020 Jan 1 | Drunk driver | 2102 | 2110 | 8 | 2803 | ken |
| | Extended duration +2 mins | 2106 | | | | tim |
| | Extended duration +2 mins | 2108 | | | | tim |
| 2020 Jan 2 | Wreck | 0918 | 1030 | 72 | 8129 | trish |

FIGURE 34

REAL TIME MUNICIPAL IMMINENT DANGER WARNING SYSTEM

CROSS-REFERENCE TO RELATED APPLICATIONS

This application is a continuation-in-part of U.S. application Ser. No. 15/869,454 which is continuation-in-part of PCT/US2016/055663 on Oct. 6, 2016 which claims the benefit of U.S. Provisional application No. 62/237,849, filed Oct. 6, 2015, the three applications being incorporated herein by reference.

FIELD OF THE INVENTION

This invention relates generally to the art of public warnings and, more particularly, to a method of government officials alerting the public in certain geographic areas of the existence of a dangerous event initiated by a federal, state, or local municipality that poses an imminent threat to nearby residents or civilians. The invention relates further to apparatuses and user apps for signature and receiving alert notifications.

BACKGROUND OF THE INVENTION

Within the United States there is an average of one death daily from high speed law enforcement pursuit situations. In the time period of 2000-2011, 218 people were killed in police pursuits in Australia. In the United Kingdom pursuit deaths have tripled in four years. On average, police response caused crashes kill two innocent bystanders each week. In addition to this complication, the use of sirens is largely ineffective because only a small percentage of drivers can hear or determine the direction of the sirens. Clearly, a better warning system is needed.

SUMMARY OF THE INVENTION

This invention provides a method and the apparatuses for government officials in a command center or from an equipped operating government vehicle to automatically provide instant emergency alerts through appropriately programmed personal electronic devices and/or connected onboard computers in vehicles to warn of imminent danger situations posing a threat to civilians within a given geographic area. The alerts give warning so that the population within the imminent danger area may stay out of harm's way, during events such as high-speed police pursuits, emergency response, fire response, etc.

It is an object of at least one embodiment of the present invention to provide for a method and, an apparatus of communicating an alert from an emergency vehicle, to a personal electronic device (PED) comprising the steps of: providing a signaling device within an emergency vehicle, the signaling device optionally having a plurality of emergency event settings selecting from the group consisting of Police pursuit, fire emergency vehicle, ambulance, emergency road closure, emergency lockdown modes and combinations thereof; transmitting a signal from the signaling device to a PED, the PED being one of a mobile phone or a dedicated receiving unit within one of an automotive vehicle, a business, or a residence, the signal providing notification of an emergency event, the PED providing an alert to individuals in communication with the PED; limiting the transmitting step to a FED or receiving unit within a predetermined location in proximity to the signaling device within the emergency vehicle; repeating the transmitting step on a regular interval and adjusting the recipients of the transmitted signal based upon a change of location of the signaling device;

Additionally notifying prior recipients of an alert that the recipient is no longer in the predetermined alert location; and transmitting an "all clear" message to the most recent grouping of alert recipients that the alert is cancelled.

It is a further object of at least one embodiment of the present invention to provide for a method wherein a predetermined location is determined in part by factors of vehicle density, time of day, population density, emergency vehicle path, and emergency vehicle direction of travel.

It is a further object of at least one embodiment of the present invention to provide for a method wherein when the receiver is in a building, an audible recorded alert is broadcast within the building.

It is a further object of at least one embodiment of the present invention to provide for a method wherein an operator of an emergency vehicle can additional provide an evacuation alert to the receiving units.

It is a further object of at least one embodiment of the present invention to provide for a method wherein the predetermined location can be established by area first responders based upon customized emergency evacuation protocols based upon zones of flooding, dam breach, industrial site emergency, chemical spill, tornado, active shooter, wildfire, tsunami, or hurricane.

It is a further object of at least one embodiment of the present invention to provide for a method wherein the step of transmitting a signal utilizes a recognition step of applicable receivers based upon GPS, geo-fencing, or smart phone location services.

It is a further object of at least one embodiment of the present invention to provide for a method wherein the step of transmitting of an alert signal provides the additional step of transmitting to authorized receiving device additional information, from the emergency vehicle including location, direction of travel, speed of travel, and mapping location onto a displayed map.

It is a further object of at least one embodiment of the present invention, to provide for a method wherein the mapping location can include additional information of location of additional emergency vehicles in the area.

It is a further object of at least one embodiment of the present invention to provide for a method wherein the receiving device can have any one or more alert functions disabled by an operator of the receiving device.

It is a further object of at least one embodiment of the present invention to provide for a method wherein the step of disabling a mode of the receiving device can be limited to a defined area selected by the operator of the receiving device.

It is a further object of at least one embodiment of the present invention to provide for a method wherein the notification signal can be one or more of the signals from the group consisting of a tone alert from the PED, a vibration of the PED, a screen display warning on the PED, a warning generated by an audio system of a car, a visual car display screen, vibration alert of a steering wheel or seat, and combinations thereof.

It is a further object of at least one embodiment of the present invention to provide for a method including the additional step of compiling historical data of emergency events and locations to provide better allocation of resources based upon emergency response needs.

It is a further object of at least one embodiment of the present invention to provide for a method and process for a 911 operator to send out an alert to civilian PEDs to alert civilians within a selectable alert territory warnings about an event in the alert territory.

It is a further object of at least one embodiment of the present invention to provide for a method and process where civilian alerts are controlled by a 911 operator through a display map interface where a 911 operator can drop a location pin which is unique to a plurality of emergency events, the nature of the individual event and geographic location of the event being factors in the geographical size and shape of the alert territory.

It is a further object of at least one embodiment of the present invention, to provide for a method and process where emergency event updates are sent to civilians as the civilians enter or leave the alert territory including an "all clear" message sent to civilians remaining within the alert area when the emergency has passed.

It is a further object of at least one embodiment of the present invention to provide for a method of communicating an alert from a 911 operator to a personal electronic device (PED) comprising the steps of: providing a signaling device accessible by a 911 operator, the signaling device optionally having a plurality of emergency event settings selecting from the group consisting of Police pursuit, fire emergency vehicle, ambulance, emergency road closure, emergency lockdown modes and combinations thereof; transmitting a signal from the 911 operator to a PED, the PED being one of a mobile phone or a dedicated receiving unit within one of an automotive vehicle, a business, or a residence, the signal providing notification of an emergency event, the PED providing an alert to individuals in communication with the PED; limiting the transmitting step to a PED or receiving unit to a predetermined location, the predetermined location being dependent upon the type of emergency event; repeating the transmitting step on a regular interval and adjusting the recipients of the transmitted signal based upon either a change of location of the signaling device or a change of location of the PED to a location outside the predetermined location; additionally notifying prior recipients of an alert that the recipient is no longer in the predetermined alert location; and transmitting an "all clear" message to the most recent grouping of alert recipients that the alert is cancelled.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 13 Preferred embodiment of agency aggregate data overview guided user interface on web portal management system.

FIG. 14 Preferred embodiment of event by event overview on guided user interface on web portal management system.

FIGS. 21 through 33 are sample maps featuring drop pins and information that can be displayed as part of an emergency signal process provided to a 911 operator.

FIG. 34 is a representative 911 operator log that shows a history of emergency events.

DESCRIPTION OF THE PREFERRED EMBODIMENT

Figure 1:
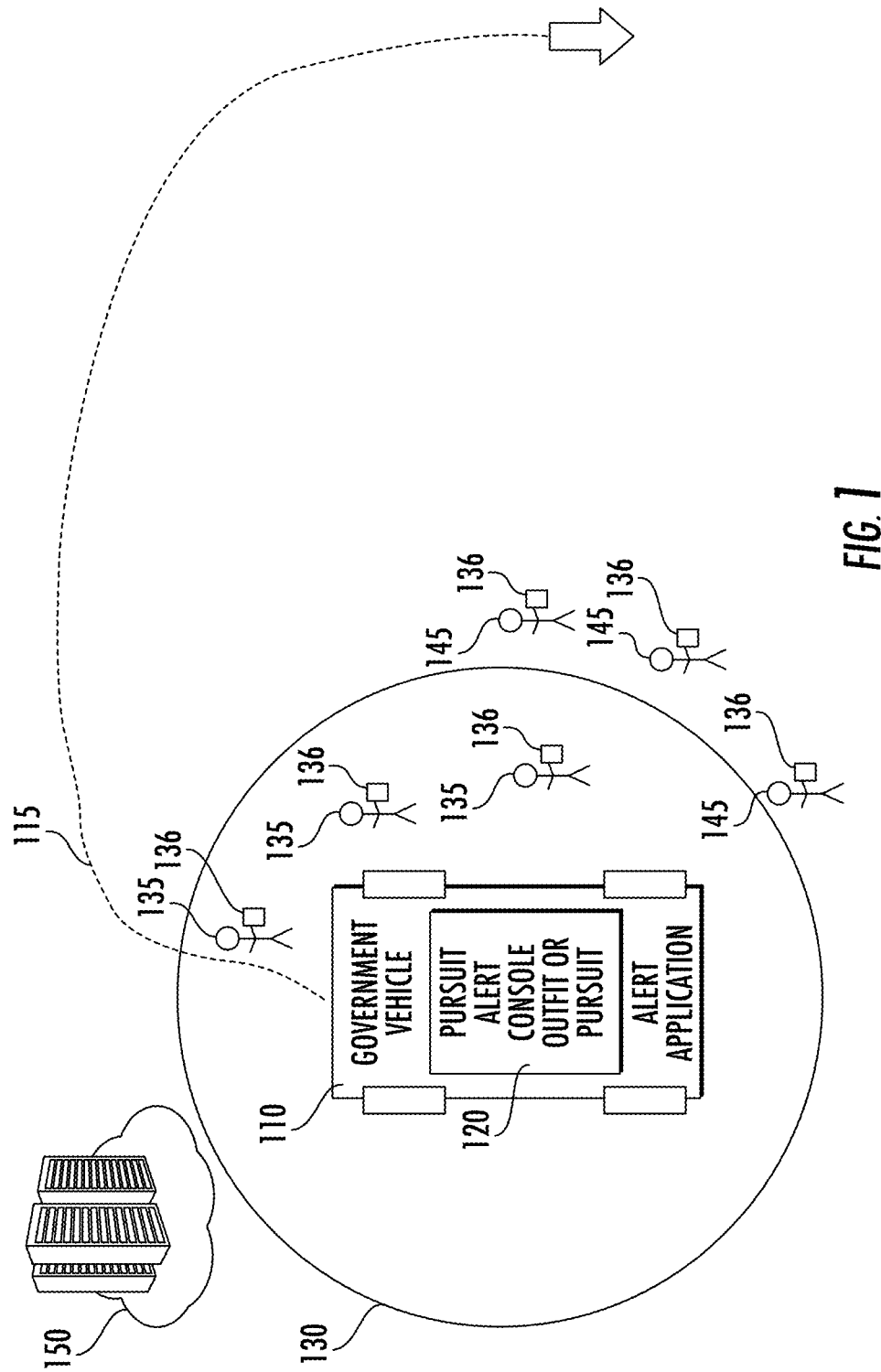
FIG. 1 Illustration depicting a government vehicle in the public space notifying civilians of imminent danger situations that can lead to serious injury or fatality.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As used herein, the following definitions are used.

"Guided user interface" refers to the collection of features and processes in which a user (civilian or government agent) operates and interacts with a virtual application installed in government vehicles and civilian operated vehicles/PEDs.

"User" refers to any individual (civilian or government agent) interfacing with any endpoints within the vehicle imminent danger warning system (government vehicle console box, government vehicle virtual application, civilian virtual application installed in civilian operated vehicles and PEDs, or individuals with permissions to use the web portal management system).

"Imminent danger situation" refers to a frame of time in which a government agent is responding to some occurrence that requires time of the essence response via a government vehicle that in doing so poses a threat to civilians. Imminent danger situations have a high probability of leading to serious injury or fatality (i.e. high-speed police pursuit, EMS truck, fire response, oncoming trains, etc.).

"At risk zone" refers to one, two, or any plurality of layered geometric vicinities extending past any geometric confines of an imminent danger zone. Civilians with the virtual civilian application installed on a civilian vehicle and/or PED within the at-risk zone will be prioritized higher than civilians not within the at-risk, zone when deciding to generate an alert to any given civilian.

"At risk radius" refers to the arbitrary geometric confines of any at-risk zone.

"Imminent danger zone" refers to the geometric vicinity around an activated government vehicle engaged in an imminent danger situation. Civilians within the imminent danger zone will receive an alert on the virtual civilian application installed on civilian vehicles and PEDs.

"Imminent danger radius" refers to the arbitrary geometric confines of the imminent danger zone.

"Shift" refers to the time interval between a console unit's power on and power off event signifying a government vehicle operator's entering and exiting the vehicle.

"Passive activity" refers to the activity of a government vehicle when the government vehicle is not engaged in an imminent danger situation.

"Blink function" refers to a function that is intended for law enforcement or government body administrative action. The blink function comprises of a virtual or physical button that integrates into the PursuitAlert™ system that allows an administrator internal to the government body (i.e. law enforcement agency) to see real time where all outfitted vehicles with the signaling devices are. An administrator of the government body presses this virtual or physical trigger which then sends a request for all signaling devices pitcher systems to relay their current position. These locations are gathered on a cloud system then pushed to populate a virtual map on a user interface for the government body administrator for viewing. This method yields a geological map with custom markers indicating the current positions of all vehicles labeled with vehicle ID and tune stamp in which GPS was retrieved. Additionally, there are delineations in marker type to indicate whether or not the signaling device is currently logged in (in active pursuit or not in active pursuit) or if the signaling device is inactive (indicating the vehicle is off).

"Drop pin function" refers to the function that is intended for the law enforcement or government body agents that operate the vehicles outfitted with pitcher systems. The drop pin function is an integral part of the pitcher system itself. The drop pin function comprises of a physical or virtual trigger (momentary on button much like a disabling button for an alarm clock) that can be activated whenever the agent deems it necessary to demark a location of significance. This trigger, when pressed, requests a GPS location with a time stamp and vehicle ID to be packaged and transmitted to, our cloud system. These packets of data can be viewed on a web portal via a map populated by these GPS locations demarked by unique markers (different markers are used for GPS locations drop pin requested during an imminent danger event and GPS locations drop pin requested not during an imminent danger event). These markers are further labeled in chronological order, time stamp in which they were requested, and can be viewed via whole shift or active imminent danger event drop pins only. Furthermore, these drop pin locations can be further commented with notations from the vehicle agent after their shift via the webportal.

"Passive patrol function" refers to an embedded function in the signaling devise system that allows administrators or agents of government bodies to passively monitor the ongoing activities of the government vehicle with a signaling device system installed. This function does not require activation by an administrator within either the government body nor PursuitAlert™ nor from an agent/operator to operate. The passive patrol comprises of software that uses the GPS to detect "significant changes" in location which can be set to an arbitrary distance between a previous location and the subsequent location. Once this significant change occurs, the software creates a small data packet containing within it the latest GPS location and the time stamp. This is an iterative process that happens continuously as the vehicle moves around. These data packets are then compressed together and labeled with a vehicle number at the end of the shift and sent to a database via some trigger event or any plurality of trigger events (i.e. turning off of car, turning off of unit, set hourly data relays, etc.). These compressed data files of GPS locations can then be recalled through a virtual interface to create maps populated with chronological GPS locations that track the movement of a vehicle and/or a fleet of vehicles over a large period of time (days, weeks, months, years, etc.) for better fleet management.

At the outset the following U.S. Patents and Publications are incorporated by reference in their entirety:
U.S. Pat. No. 8,914,012
U.S. Patent Publication No. 2015/0172897
U.S. Pat. No. 8,265,938
U.S. Pat. No. 6,684,155
U.S. Pat. No. 8,756,248

U.S. Pat. No. 6,630,892
U.S. Pat. No. 6,958,707

PursuitAlerts™ technology platform is a method of mass communication of imminent danger posed to civilians in the public space due to imminent danger situations engaged by government vehicles. FIG. 1 is an illustrative general overview depicting a government vehicle (110) in the public space notifying civilians of an imminent danger situation that can lead to serious vehicular injury of fatality.

Figure 3:
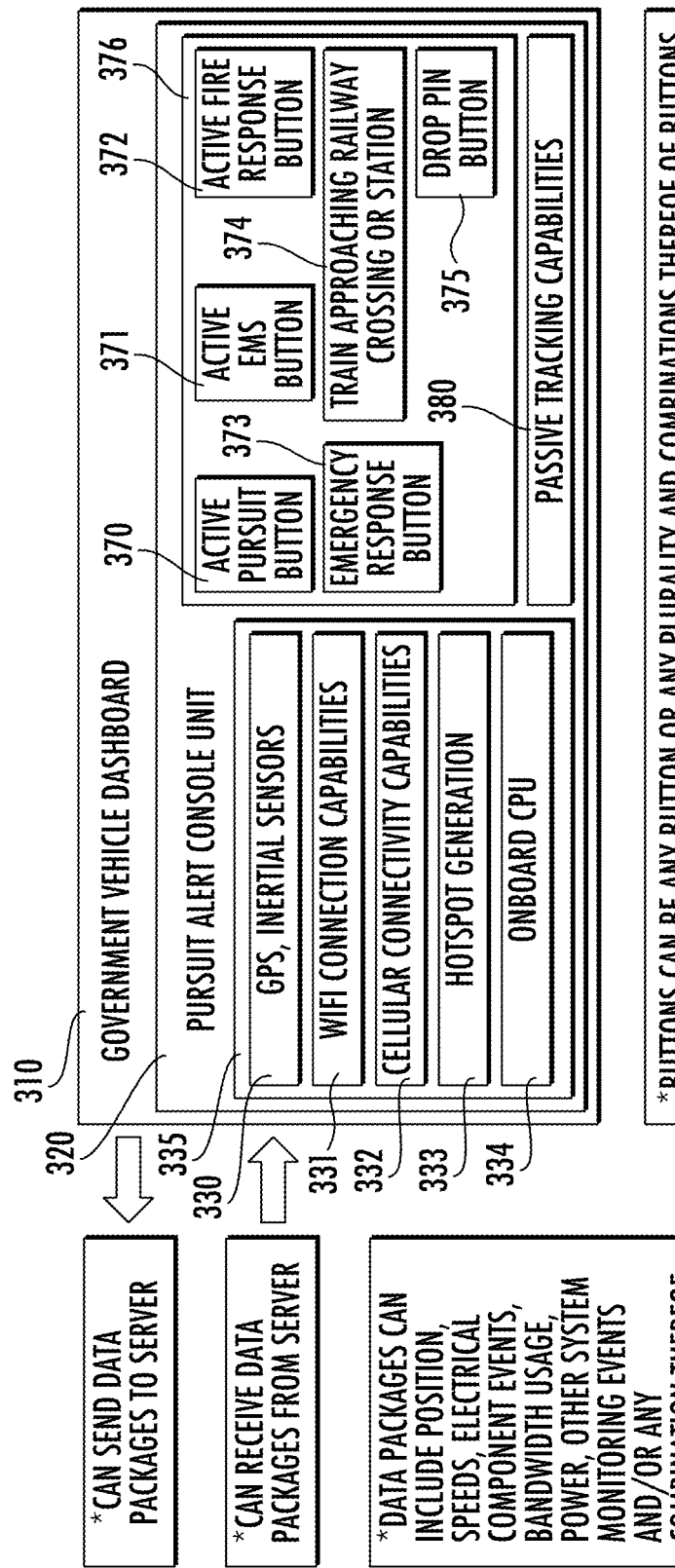
FIG. 3 Subsystem diagram of an alert apparatus console unit to be installed in government vehicles.
Figure 4:
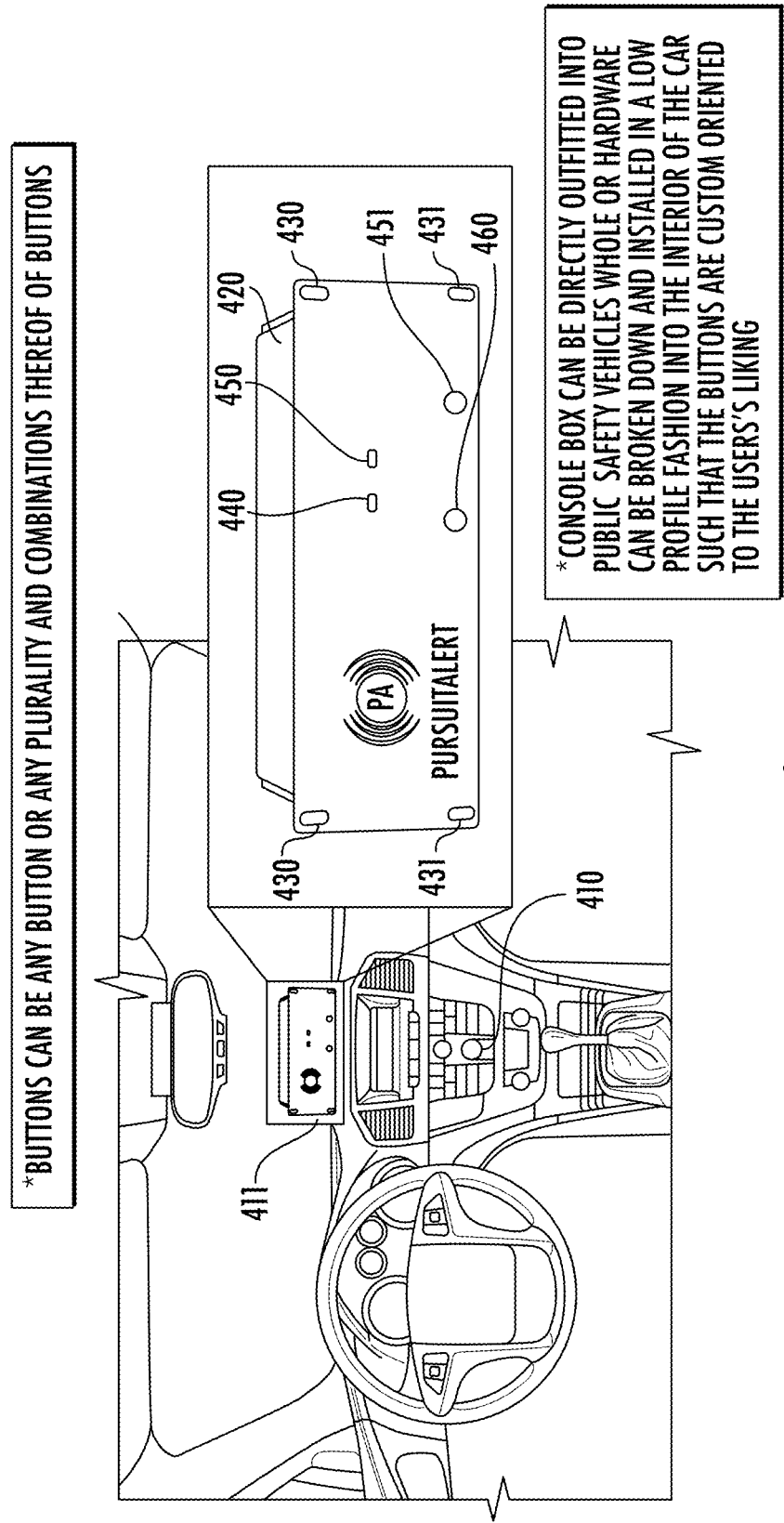
FIG. 4 Preferred embodiment of console unit to retrofit currently used government vehicles.
Figure 5:
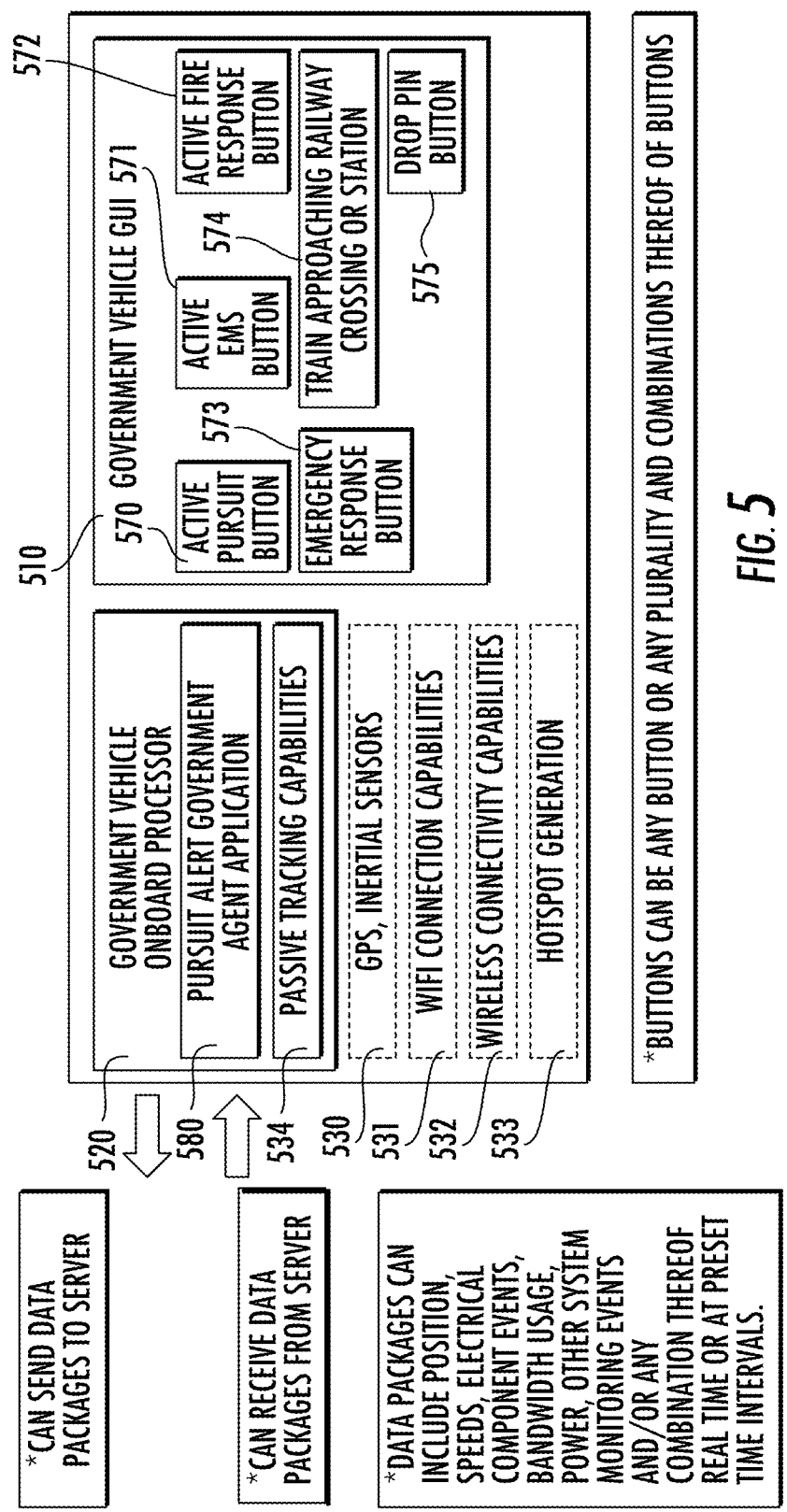
FIG. 5 Subsystem block diagram of an alert apparatus process for virtual government agent application to be installed in government vehicles.
Figure 6:
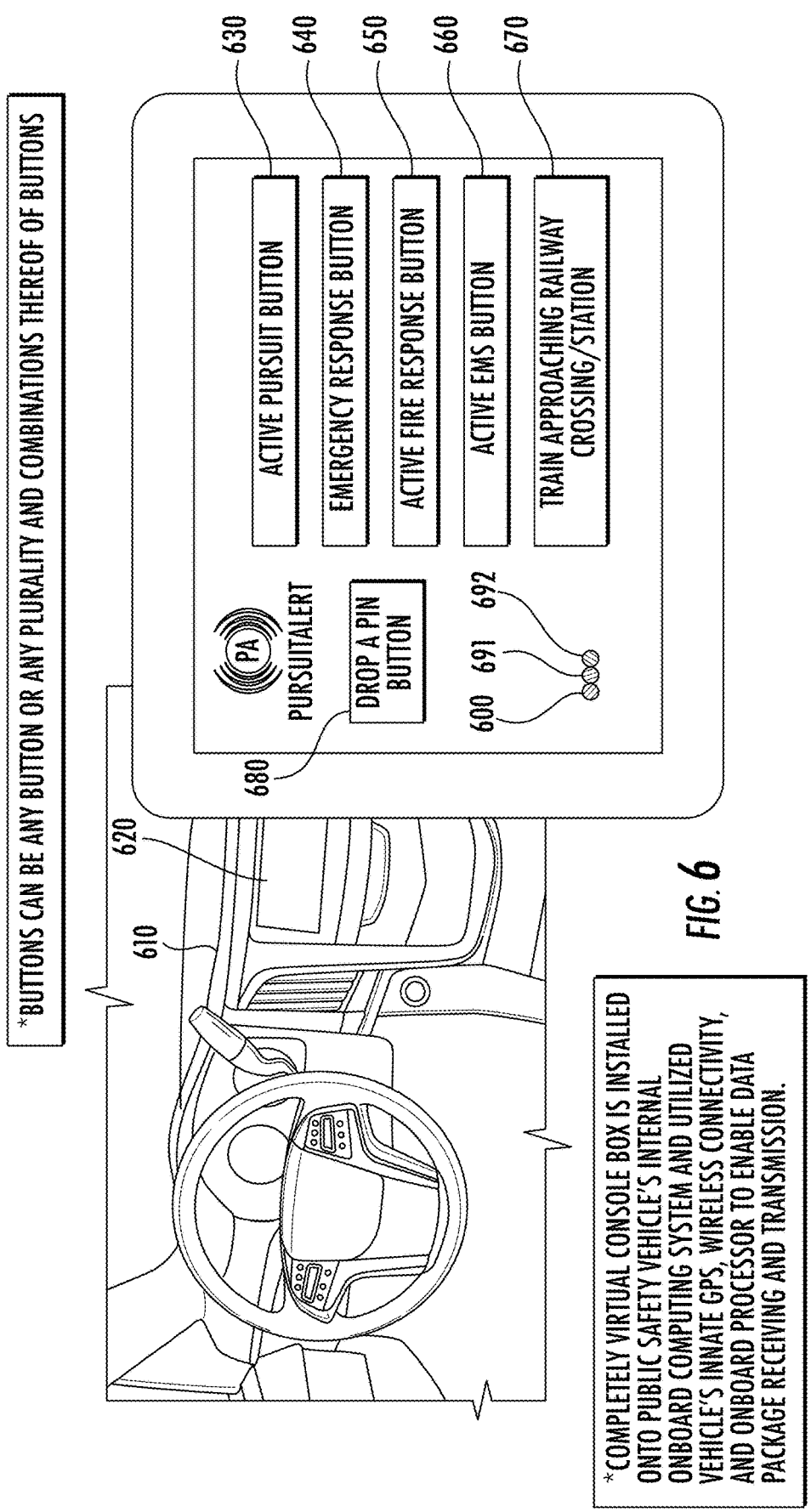
FIG. 6 Preferred embodiment of a virtual government agent alert application to be installed in government vehicles.

Now referring to FIG. 1, a government vehicle (110) installed with a PursuitAlert™ console unit or PursuitAlert™ virtual government agent application (120) engages in an imminent danger situation to civilians (135 and 145) in the public space. Further details of the PursuitAlert™ console unit are illustrated in FIGS. 3 and 4. Further details of the PursuitAlert™ virtual government agent application are illustrated in FIGS. 5 and 6.

Figure 2:
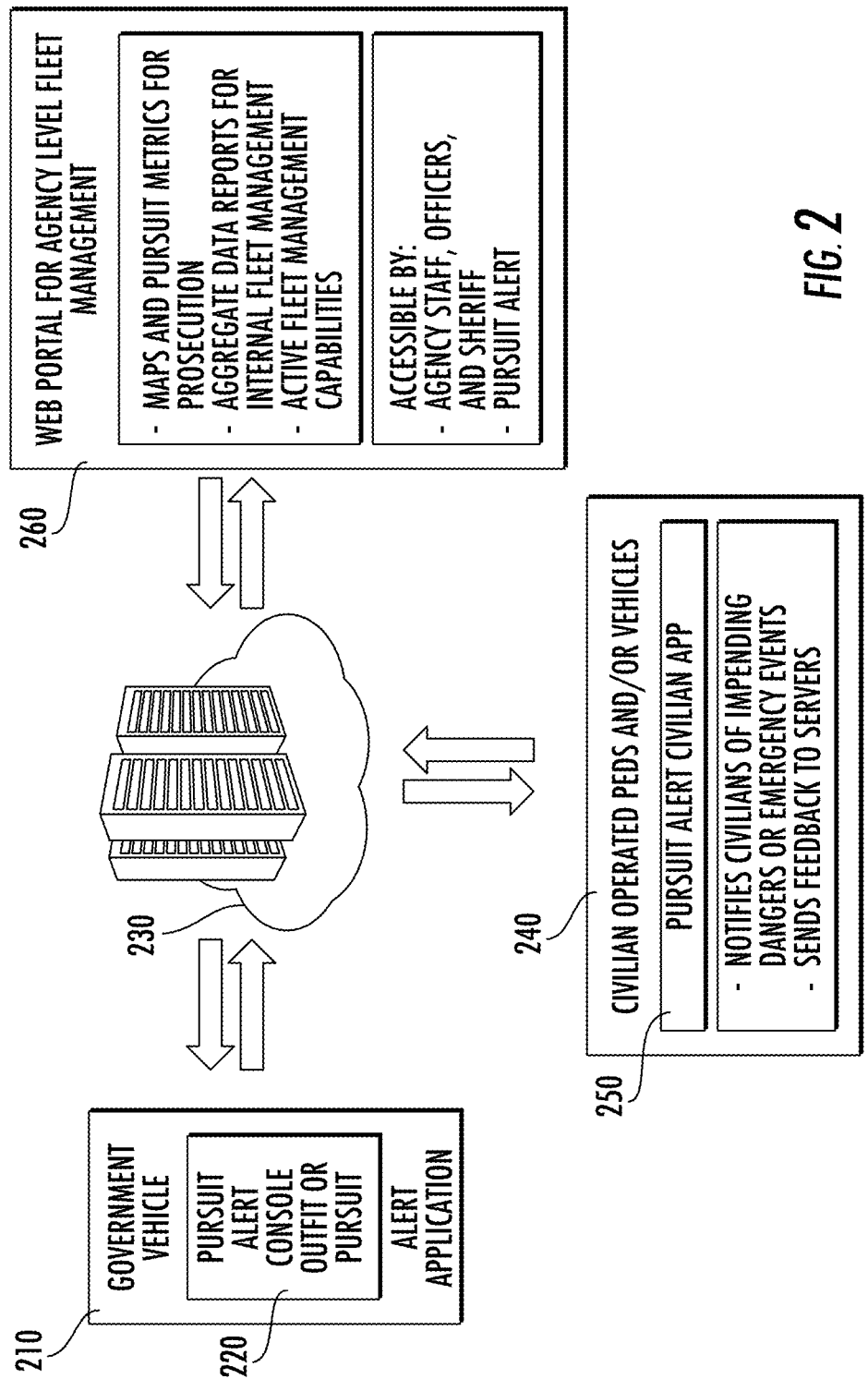
FIG. 2 System diagram depicting a critical message activation and fleet management system that notifies civilians of imminent danger situations that can lead to serious vehicular injury of fatality.
Figure 8:
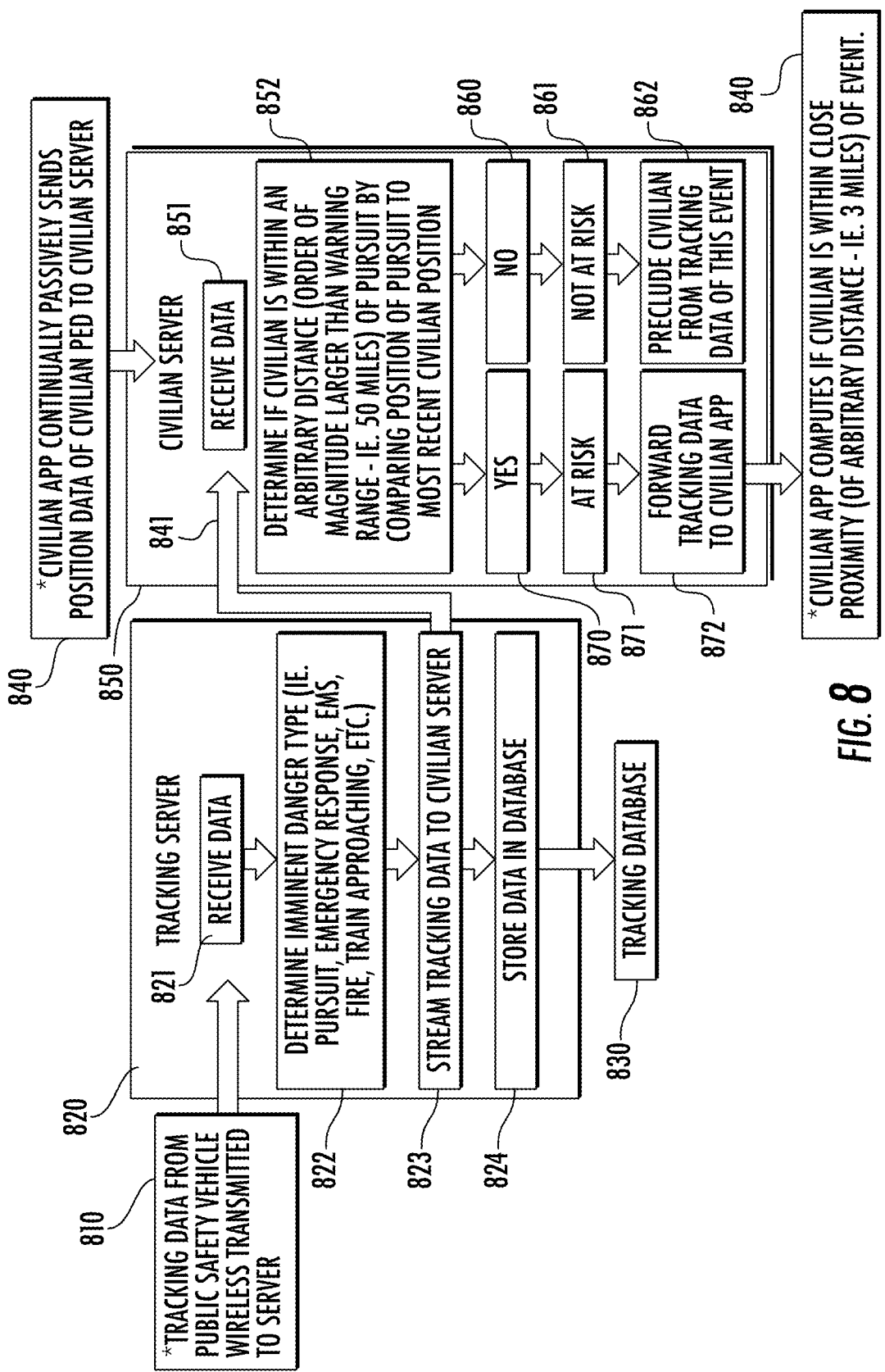
FIG. 8 Subsystem diagram of cloud server infrastructure for critical messaging activation and alert generation to civilian operated PEDs and vehicles.

The operator of the government vehicle (110) activates engagement of such an event as depicted in FIG. 1 by interfacing with the features of the PursuitAlert™ console unit or PursuitAlert™ virtual government agent application (120) to collect certain data and transmit these data regarding the motion, location, and activity of the government vehicle (110) as well as certain activities of the operator or any combination thereof at any given time to a backend infrastructure (150). Further details of the backend infrastructure are illustrated in FIGS. 2 and 8. Further details of the PursuitAlert™ console unit are illustrated in FIGS. 3 and 4. Further details of the PursuitAlert™ virtual government agent application are illustrated in FIGS. 5 and 6.

Using this data collected from the PursuitAlert™ console unit PursuitAlert™ virtual client application (120) or combined with certain data collected from the civilian application (136) installed on civilian personal electronic devices or on the onboard computer systems within civilian vehicles, the backend infrastructure (150) can determine whether to activate or not to activate critical messaging protocols to generate notifications to make civilians (135 and 145) in the public space of an event that may pose an imminent danger. Further details of the civilian application are illustrated in FIG. 9-12.

The decision whether or not to activate critical messaging protocols to generate these notifications to civilians (135 and 145) is dependent on their arbitrary locational proximity to the government vehicle (110). If the civilian (135) is within a certain arbitrary locational proximity zone of any arbitrary geometry (130), the civilian (135) is at risk of danger and activation of critical messaging protocols to generate these notifications to these civilians (135) thus informing these civilians of imminent danger nearby through visual, audible, vibrational, etc. capabilities or any combination thereof via personal electronic devices and/or civilian vehicles installed with the civilian application (136). If the civilian (145) is outside of a certain arbitrary locational proximity zone of any arbitrary geometry (130), the civilian (145) is not at risk of danger no further action is taken thus no notifications are generated via personal electronic devices and/or civilian vehicles installed with the civilian application (136).

As the government vehicle (110) moves through a public space, this sequence of events previously described repeats iteratively. Civilians (135) that were previously notified but are no longer within a certain arbitrary locational proximity zone of any arbitrary geometry (130), are sent a notification informing these civilians that they are no longer in imminent danger however to still remain cautious.

Until the operator of the government vehicle (110) deactivates engagement in an event, this sequence of events previously described repeats iteratively. Once the operator of the government vehicle (110) deactivates engagement in an event, all civilians that received notifications for imminent danger (135) receive a notification informing these civilians (135) that the event has ended and no imminent danger exists.

FIG. 2 is a system diagram that illustrates the basic overview of PursuitAlert™'s cloud platform that is designed to intake certain data pertaining to government vehicles and civilians in the public space to determine and forward critical messages to civilians in public spaces to make them aware of imminent danger situations created by government vehicles. Built into this technology platform are capabilities to store and analyze data for later review by government agencies and PursuitAlert™ to promote more efficient use of resources and public safety.

Now referring to FIG. 2, the PursuitAlert™ console unit or PursuitAlert™ virtual client application (220) is installed in government vehicles (210). The operator of government vehicles (210) mechanically manipulates certain components (described in detail in FIGS. 3 and 4) of the PursuitAlert™ console unit (220) or interacts with the virtual guided user interface of the PursuitAlert™ government agent application (220) (described in detail in FIGS. 5 and 6) to activate certain actions. These actions include but are not limited to activating collection and transmission of certain data regarding the motion, location, and activity of the government vehicle (210) as well as certain activities of the operator or any combination thereof at any given time to a backend infrastructure (230). The PursuitAlert™ console unit or PursuitAlert™ government agent application (220) can also passively transmit certain data regarding the motion, location, and activity of the government vehicle (210) as well as certain activities of the operator at any given time to a backend infrastructure (230) at set time intervals in an automated fashion. The PursuitAlert™ console unit or PursuitAlert™ virtual client application (220) makes use of cellular connectivity or wireless network capabilities to transmit these certain data to the backend infrastructure (230).

The backend infrastructure (230) contains certain pieces of software (described in detail in FIG. 8) that receive continuous automated updates civilians with the civilian application (250) downloaded or installed on personal electronic devices (PEDs) or vehicles with wireless connection and onboard processing capabilities (240) owned by civilians. Further details of the civilian application are illustrated in FIG. 9-12.

Figure 7:
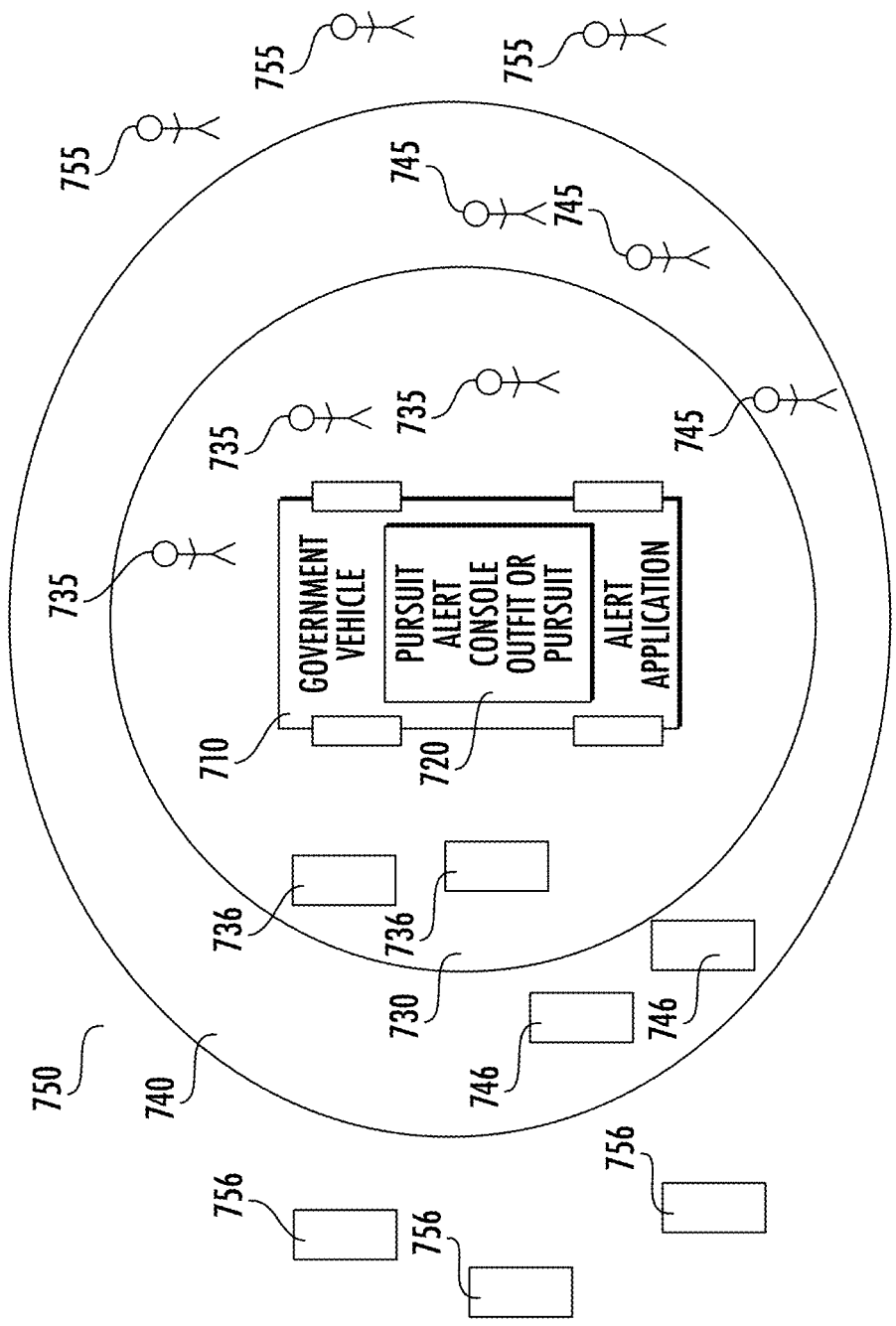
FIG. 7 Illustration of civilian geofencing to identify most at risk civilians in an imminent danger situation activated by a government agent operating a government vehicle.

The backend infrastructure (230) contains certain pieces of software (described in detail in FIG. 8) that determine if a civilian is at risk of being in danger or not at risk of being in danger from an imminent danger situation activated from a PursuitAlert™ console unit or PursuitAlert™ government agent application (220) by comparing certain data regarding the arbitrary geological location and motion of the government vehicle (210) provided by the PursuitAlert™ console unit or PursuitAlert™ government agent application and civilian locations provided by the civilian application (250). Certain pieces of software contained within the backend infrastructure (230) determine if the certain data regarding the arbitrary geological location and motion of the government vehicle (210) exceed an arbitrary proximity threshold to the civilian's personal electronic devices or vehicle to determine if the civilian is at risk of being in danger or not at risk of being in danger from an event involving a government vehicle (210). Further details describing the functions of the certain pieces of software of the backend infrastructure pertaining to determination of at risk and not at risk civilians are illustrated in FIGS. 7 and 8.

If the civilian is determined to be in danger, certain data are transmitted through wireless network communication or cellular connectivity to the civilian application (250) (described in detail in FIGS. 9-12). The civilian application (250) then locally computes whether or not the civilian is in imminent danger or not in imminent danger from an activated event regarding a government vehicle (210). If the civilian application (250) determines that the civilian is in imminent danger regarding a government vehicle (210), an alert is generated through existing components within the personal electronic device or vehicle with wireless connection and onboard processing capabilities owned by civilian (240) installed with the civilian application (150). These alerts can be audio, text, visual flashing, vibration or any combination thereof utilizing existing technology in personal electronic device or vehicle owned by the civilian (240).

At any point in time, government operators or employees of PursuitAlert™ can access all data generated from PursuitAlert™ console unit or PursuitAlert™ government agent application (220) through the web portal management system (260). The web portal management system (260) is used to generate reports on individual government vehicle (210) activity data or aggregates of deidentified data of groups of government vehicles (210) to promote better use of resources or promote public safety. Further details of the functionality of the web portal management system are illustrated in FIGS. 13-19.

Now referring to FIG. 3, an illustration of the system overview of a PursuitAlert™ console unit to be installed in government vehicles. The purpose of these PursuitAlert™ console units are to detect and transmit certain data pertinent to the government vehicle's arbitrary geological location, motion, and operator for further analysis as well as receive instructions for better fleet management.

The PursuitAlert™ console unit (320) is installed into government vehicle dashboards (310) by some arbitrary combination of fasteners and harnesses. Contained within the PursuitAlert™ console unit (320) is an arbitrary collection of components, and sensors (335) in an arbitrary orientation that includes but is not limited to GPS or inertial sensors (330), modules enabling wifi connection capabilities (331), modules enabling cellular connectivity or wireless network capabilities (332), modules enabling hotspot generation (333), and onboard processors (334) or any combination thereof.

This arbitrary collection of components and sensors (335) are normally passively remaining active controlled by certain pieces of software (380) contained within the onboard processors (334) that dictate passive sampling of certain data pertaining to the government vehicles geological location and motion. Sampling of certain data pertaining to the government vehicle's geological location and motion is determined by exceeding an arbitrary displacement threshold of the government vehicle. However, passive activity of this arbitrary collection of components and sensors (335) are overridden by a government agent's physical manipulation of an arbitrary plurality of buttons, toggle switches, and other physical activators (376). This arbitrary collection of buttons, toggle switches, and other physical activators (376) can include but is not limited to or can combine any plurality or combinations thereof of active pursuit buttons (370), active EMS buttons (371), active lire response buttons (372), emergency response buttons (373), train approaching railway station or crossing buttons (374), or momentary on button to record locations at any given point in time (375).

Now referring to FIG. 4, an illustration of the preferred embodiment of the PursuitAlert™ console unit used to retrofit existing government vehicles. The PursuitAlert™ console unit (411) is installed into the dashboard of government vehicles (410) in an arbitrary location that is located in close proximity (within reaching distance) of the government agent for easy access and operation. The PursuitAlert™ console unit (411) is secured into the dashboard of government vehicles (410) with a mechanical harness (430) of arbitrary geometry and orientation with respect to the PursuitAlert™ console unit enclosure (420) with any plurality or combinations thereof of holes, protrusions, or features (431) to allow for fasteners to physically attach the mechanical harness (430) to the dashboard of the government vehicle (410).

The operator of any given government vehicle turns on the PursuitAlert™ console unit (411) by mechanically interacting with the power button (440). In the event of an imminent danger situation, the government operator mechanically interacts with any plurality or combination thereof of switches, buttons, and other toggling features (450, 451-455). Once the imminent danger event has concluded, the government operator mechanically interacts with any plurality or combination thereof of switches, buttons, and other toggling functions (450, 451-455) to revert functions back to default settings. Any plurality or combination thereof arbitrary colored lights (460) indicate any plurality or combination thereof digital connections (i.e. connection to PursuitAlert™ backend infrastructure, obtaining wireless connection, etc.).

Now referring to FIG. 5 an illustration of a system diagram of the PursuitAlert™ government agent application to be installed directly into government vehicle onboard processing units already outfitted with any plurality or combination thereof onboard processing components, wireless communication modules, and suites of sensors detecting certain data pertinent to the external and internal environment of the vehicle from any plurality of arbitrary original equipment manufacturers (Ford, GM, Chrysler, Chevy, Dodge, EU brands, Japanese brands, Australian brands, etc.).

The PursuitAlert™ government agent application (580) is installed directly onto the onboard processor (520) at the original car manufacturer or licensed vendors with rights to manipulate certain pieces of software contained within the original car manufacturer's onboard processor. The PursuitAlert™ government agent application (580) detects certain data pertaining to the government vehicles geological location and motion, transmits, and receives certain data. The PursuitAlert™ government agent application (580) utilizes any existing plurality GPS and inertial sensors (530), components enabling wifi connection (531), components enabling wireless connectivity (532), components enabling hotspot generation (533), and certain pieces of software and set protocols installed on the government vehicle onboard processor (520) to control any plurality or combination thereof features inside of the vehicle (i.e. heads up display, audio, seat vibration, etc.) already installed into the government vehicle or any combination thereof.

Contained within the PursuitAlert™ government agent application (580) is controlled by certain pieces of software that dictate passive sampling (534) of certain data pertaining to the government vehicles geological location and motion that utilizes. Sampling of certain data pertaining to the government vehicle's geological location and motion is determined by exceeding, an arbitrary displacement threshold of the government vehicle. However, passive activity of this arbitrary collection of components and sensors (534) is overridden by a government agent's physical manipulation of an arbitrary plurality of virtual buttons, toggle switches, and other activating features on the government vehicle guided user interface (510). This arbitrary collection of virtual buttons, toggle switches, and other activating, features on the government vehicle guided user interface (510) can include but is not limited to or can combine any plurality or combinations thereof of active pursuit buttons (570), active EMS buttons (571), active fire response buttons (572), emergency response buttons (573), train approaching railway station or crossing buttons (574), or momentary on button to record locations at any given point in time (575).

Now referring to FIG. 6, an illustration of the preferred embodiment of the PursuitAlert™ government agent application to be installed onto government vehicle onboard processors at the original equipment manufacturer of the vehicle. The operator of a government vehicle interacts with the PursuitAlert™ government agent application guided user interface (620) already provided by an original equipment manufacturer of government vehicles in an arbitrary location that is located in close proximity (within reaching distance) of the operator for easy access and operation. The PursuitAlert™ government agent application guided user interface (620) is secured into the dashboard or center console unit of government vehicles (610) with some mechanical, harness of arbitrary composite and geometry provided by the original equipment manufacturer of the government vehicle.

In the event of an imminent danger situation, the government operator interacts with any plurality or combination thereof of virtual switches, buttons, and other toggling features (630, 640, 650, 660, 670, 680). This arbitrary collection of virtual buttons, toggle switches, and other activating features on the government vehicle guided user interface (620) can include but is not limited to or can combine any plurality or combinations thereof of active pursuit buttons (630), active EMS buttons (640), active fire response buttons (650), emergency response buttons (660), train approaching railway station or crossing buttons (670), or momentary on button to, record locations at any given point in time (680).

These virtual features can be oriented in any arbitrary geometry or orientation. Once the imminent danger event has concluded, the government operator mechanically interacts with any plurality or combination thereof of switches, buttons, and other toggling functions (630, 640, 650, 660, 670, 680) to revert functions back to default settings. Any plurality or combination thereof arbitrary colored lights (690-692) indicate any plurality or combination thereof digital connections (i.e. connection to PursuitAlert™ back-end infrastructure, obtaining wireless connection, etc.).

Now referring to FIG. 7, an illustration of civilian geofencing to identify if civilians (735, 745, 755) or civilian operated vehicle (736, 746, 756) are at risk or not at risk of being in imminent danger during an active imminent danger situation activated by a government agent operating a government vehicle (710) equipped with a PursuitAlert™ console unit or PursuitAlert™ government agent application (720). Further details on the PursuitAlert™ console unit are illustrated in FIGS. 3 and 4. Further details on the Pursuit-Alert™ government agent application are illustrated in FIGS. 5 and 6.

Determining if a civilian (735, 745, 755) or civilian operated vehicle (736, 746, 756) is at-risk or not at-risk is dependent on their arbitrary proximity to the government vehicle (710) equipped with a PursuitAlert™ console unit or PursuitAlert™ government agent application (720).

If any civilian (735) or civilian operated vehicle (736) is within some arbitrary zone (730) defined by some arbitrary geometry encapsulating the immediate vicinity of the government vehicle (710), civilians (735) and civilian operated vehicles (736) are notified of immediate, imminent danger.

If any civilian (745) or civilian operated vehicle (746) is within some larger arbitrary zone (740) defined by some arbitrary geometry encapsulating the immediate vicinity of an enrolled agency jurisdiction or servicing region containing the arbitrary imminent danger zone (730), civilians (745) and civilian operated vehicles (746) are not notified with digital alerts however are determined to be at-risk. At-risk civilians (745) and civilian operated vehicles (746) are categorized separately on the cloud server infrastructure (FIG. 8) to enable more efficient tracking and notification generation in this at-risk civilian population (745, 746) that have high probability of moving into the arbitrary imminent danger zone (730) as the government vehicle (710) moves through the public space. More details on the cloud server infrastructure for critical message activation and alert generation is described in FIG. 8.

Civilians (755) and civilian operated vehicles (756) not located within the imminent danger zone (730) or the at-risk zone (740) do not receive any notifications and are labeled as not at-risk. These civilians (755) and civilian operated vehicles (756) have a near zero probability of being in imminent danger from the imminent danger situation activated by an operator of a government vehicle (710).

Now referring to FIG. 8, an illustration of the system diagram of the cloud server infrastructure for critical messaging and alert generation to civilian personal electronic devices and civilian operated vehicles. The cloud server infrastructure intakes any plurality or combination thereof certain data pertaining to the temporal actions, location of these actions, motion during these actions, and environmental factors both internal and external to a government vehicle operated by a government agent during these actions as well as certain data pertaining to civilian geographical, location then analyzes these certain data to determine if a civilian is at-risk or not at-risk. After determining if a civilian is at-risk or not at-risk, certain data are or are not sent to civilian applications installed on civilian operated personal electronic devices or civilian operated vehicles.

Certain data pertaining to the location, motion, environmental factors both internal and external to the government vehicles, and the time at which these data points were detected (810) is transmitted from the PursuitAlert™ console unit (FIGS. 3 and 4) or PursuitAlert government agent application (FIGS. 5 and 6) to the tracking server (820). The tracking server (820) contains certain pieces of software that receive the data (821), certain pieces of software that determine the type of imminent danger (i.e. pursuit, emergency response, EMS, fire, train approaching, etc.) (822), certain pieces of software that transmit (823) certain data (841) to the civilian server (850), and then sort and store all the incoming data (824) into a database of all tracked information (830).

While the tracking server (820) is managing certain data of all government vehicles installed with PursuitAlert™ console unit (FIGS. 3 and 4) or PursuitAlert™ government agent application (FIGS. 5 and 6), the civilian server (850) is managing certain geographical location data pertaining to an arbitrary number of civilians transmitted from civilian applications (840) installed on civilian operated personal electronic devices and civilian operated vehicles. Further details about the civilian application installed on civilian operated personal electronic devices and civilian operated vehicles are described in FIGS. 9-12.

The civilian server (850) contains certain pieces of software that receives and partitions (851) certain geographical location data pertaining to an arbitrary number of civilians transmitted from civilian applications (840) installed on civilian operated personal electronic devices and civilian operated vehicles and certain data of all government vehicles installed with PursuitAlert™ console unit (FIGS. 3 and 4) or PursuitAlert™ government agent application (FIGS. 5 and 6. After certain pieces of software receive (851) all the certain data that may be pertinent to an imminent danger situation (840, 841), these certain data are then transferred to certain pieces of software that determine (852) if the civilian's arbitrary geographical location is within an at-risk zone of arbitrary geometry (as described in FIG. 7).

If the civilian's arbitrary geographical location is within an at-risk zone of arbitrary geometry (as described in FIG. 7), then certain pieces of software (870-872) categorize the civilian as at-risk and transmit certain data (841) to the civilian application (840) for further determination locally if the civilian is in the imminent danger zone or not. If the civilian's arbitrary geographical location is within an at-risk zone of arbitrary geometry (as described in FIG. 7), then certain pieces of software (860-862) categorize the civilian as not at-risk. Not at-risk civilian applications remain passively active and are not activated to take further action. Further details about the civilian application installed on civilian operated personal electronic devices and civilian operated vehicles are described in FIGS. 9-12.

Figure 20:
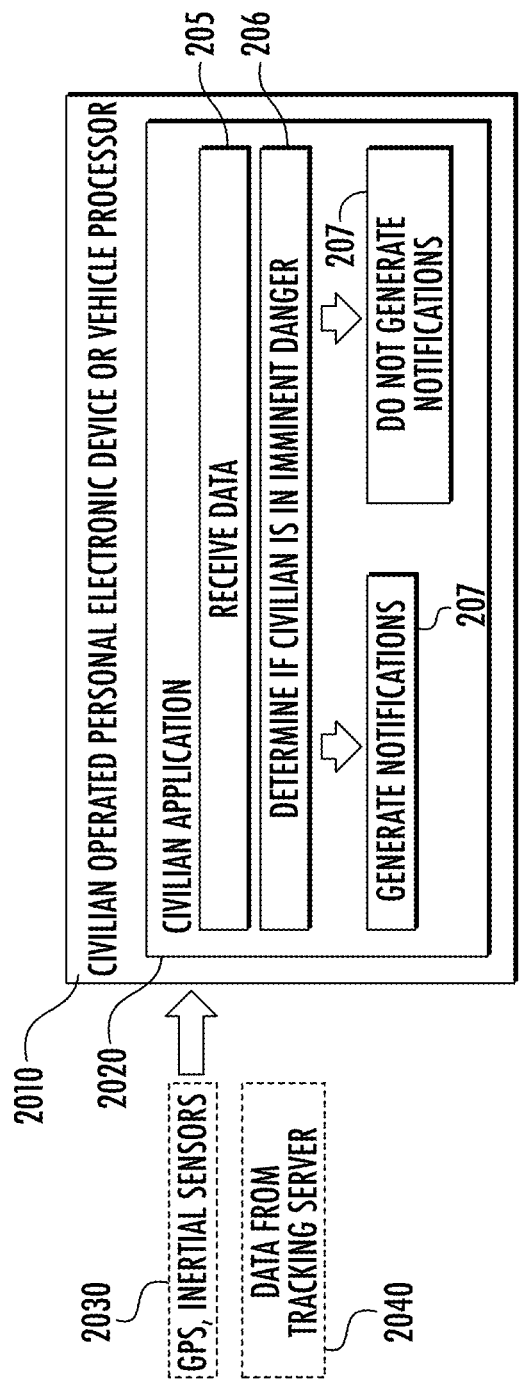
FIG. 20 is a diagram of a civilian receiver and process of operating the receiver.
Figure 21:
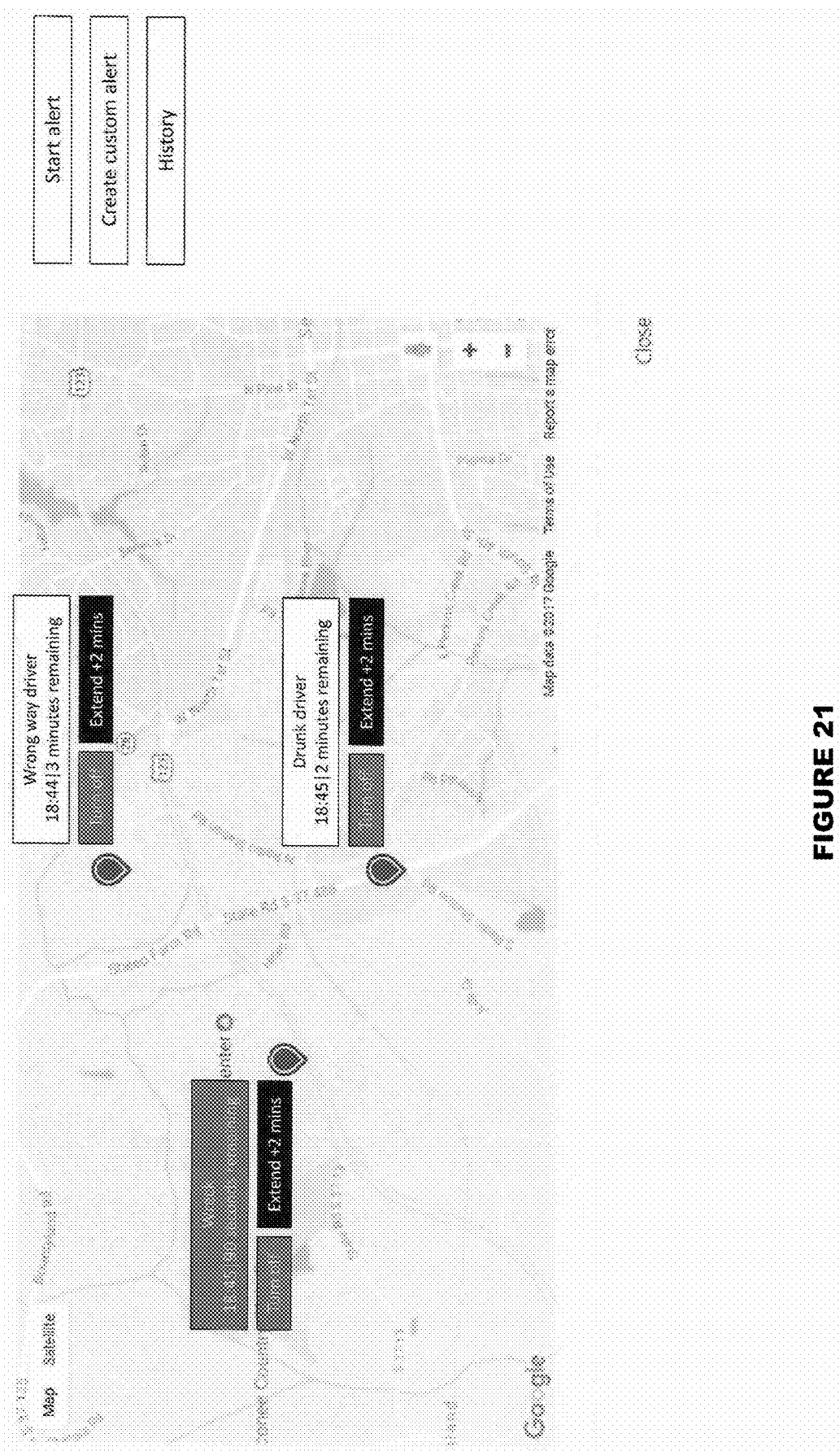
Figure 22:
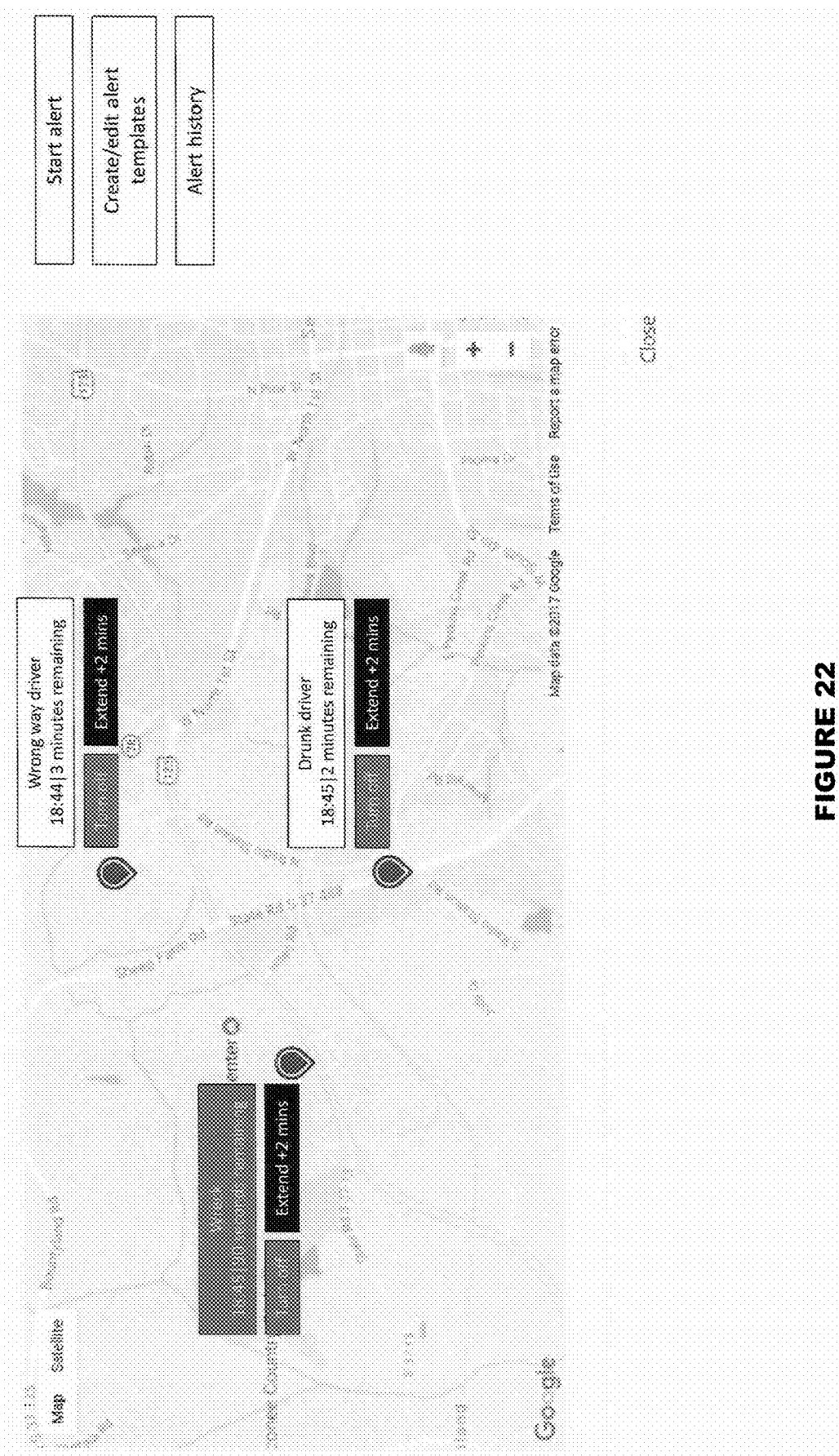
Figure 23:
Figure 24:
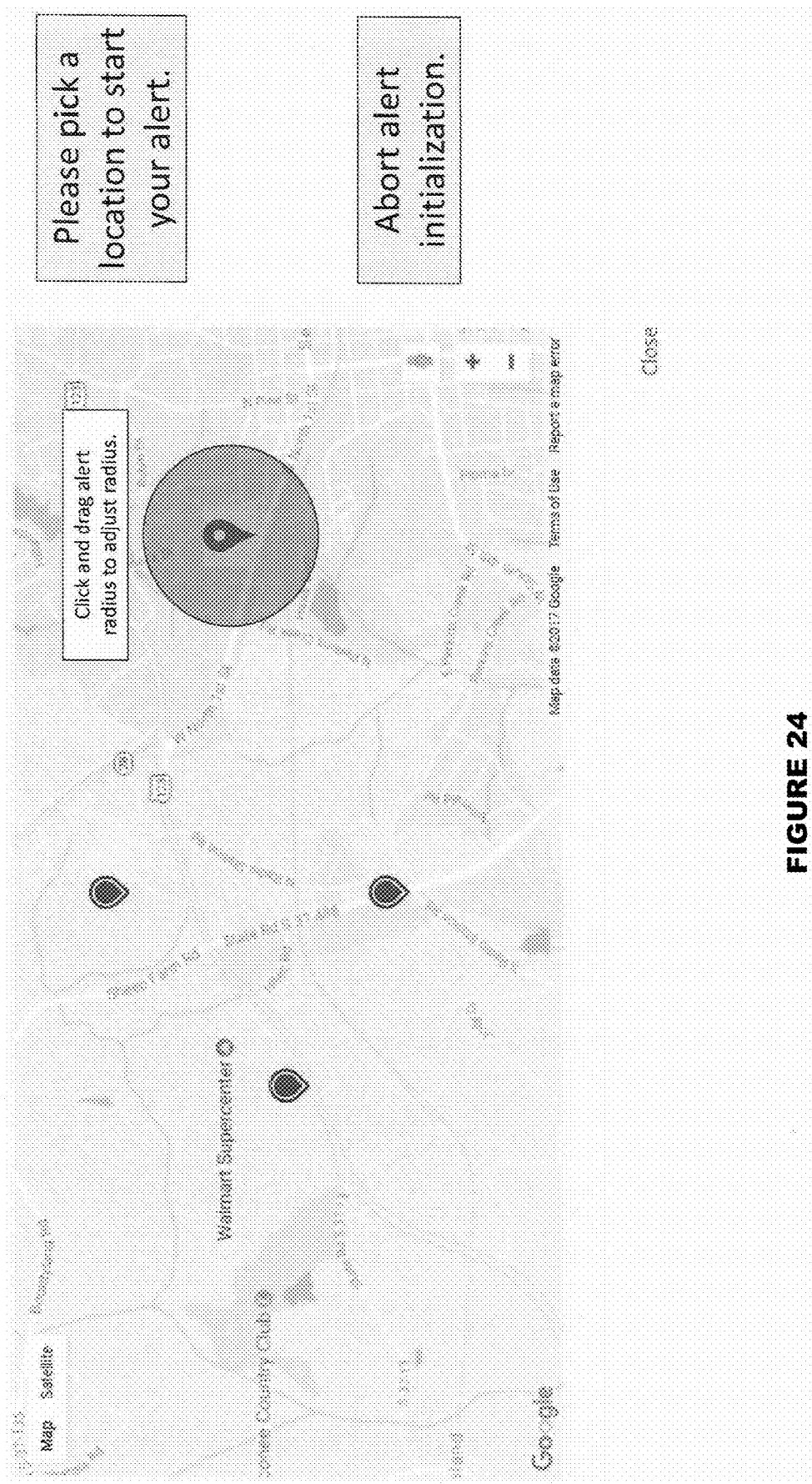
Figure 25:
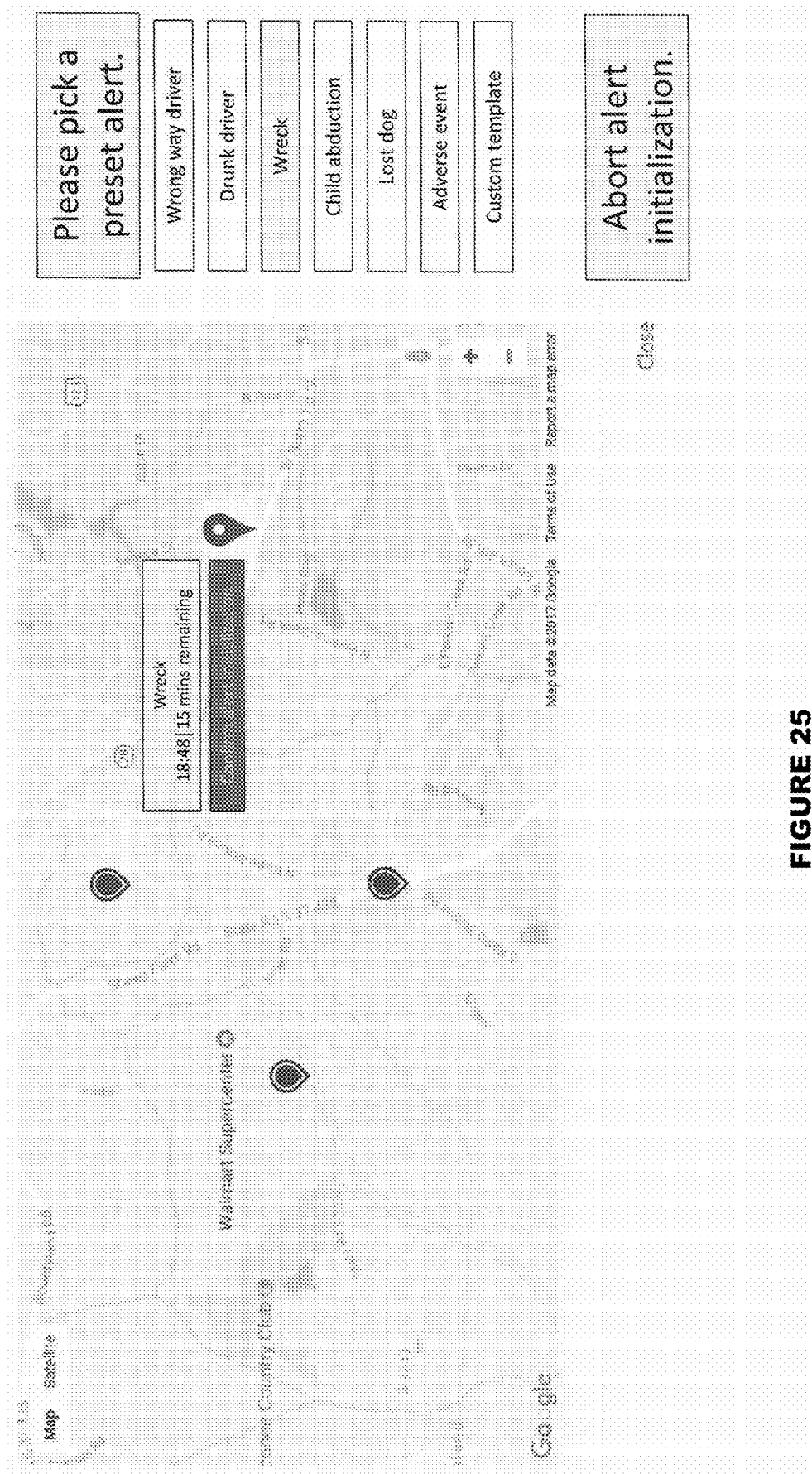
Figure 26:
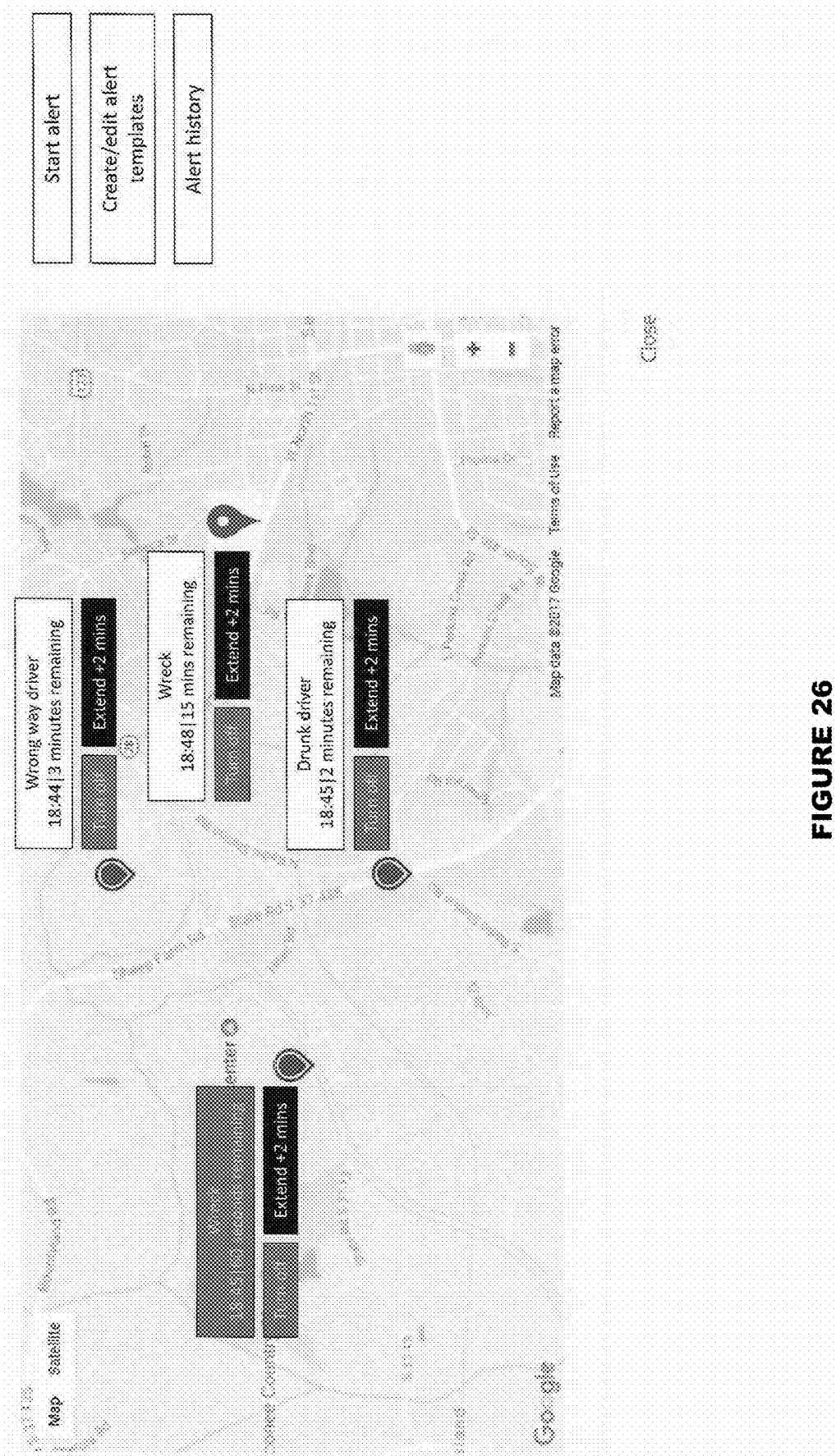
Figure 27:
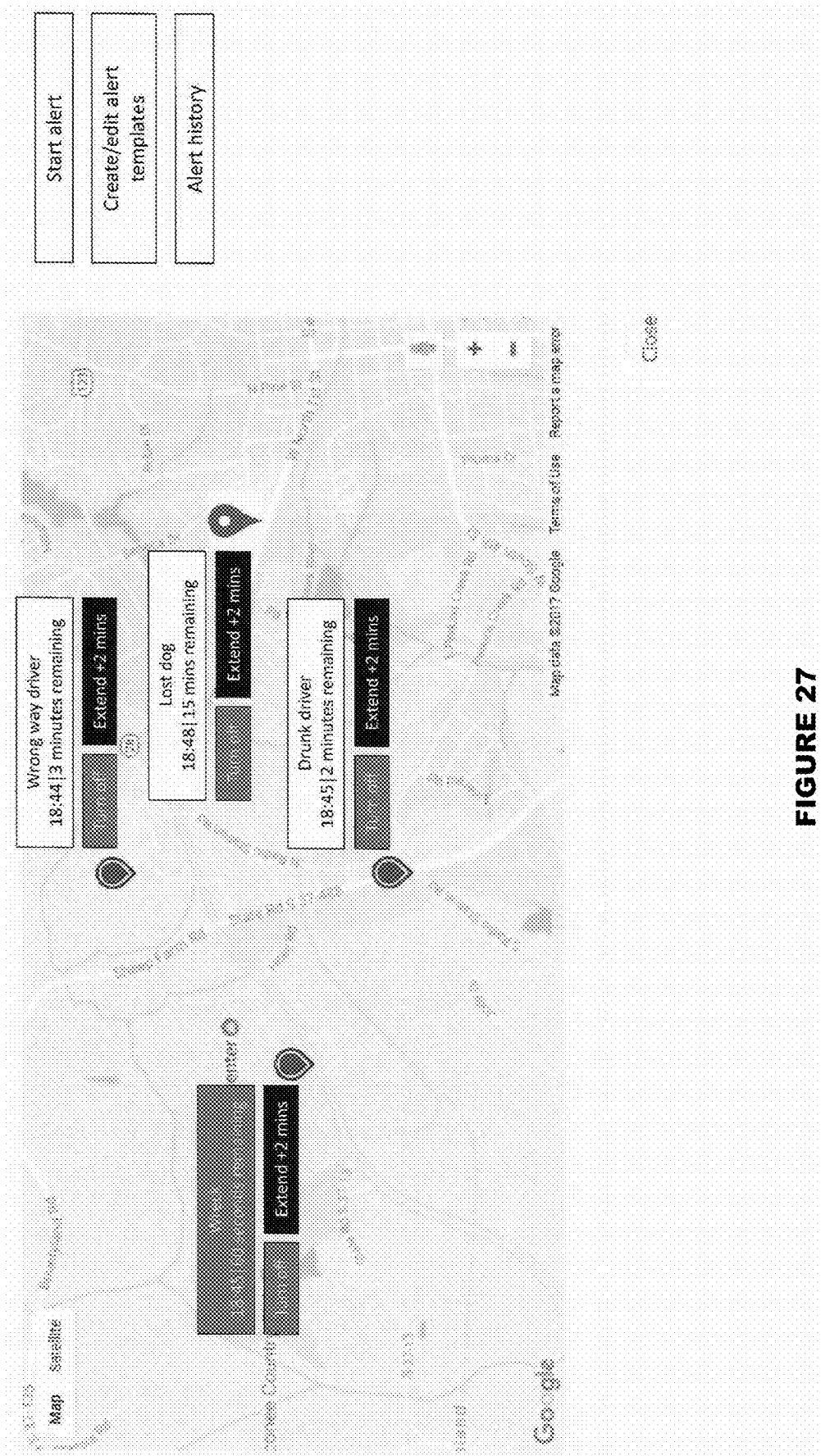
Figure 28:
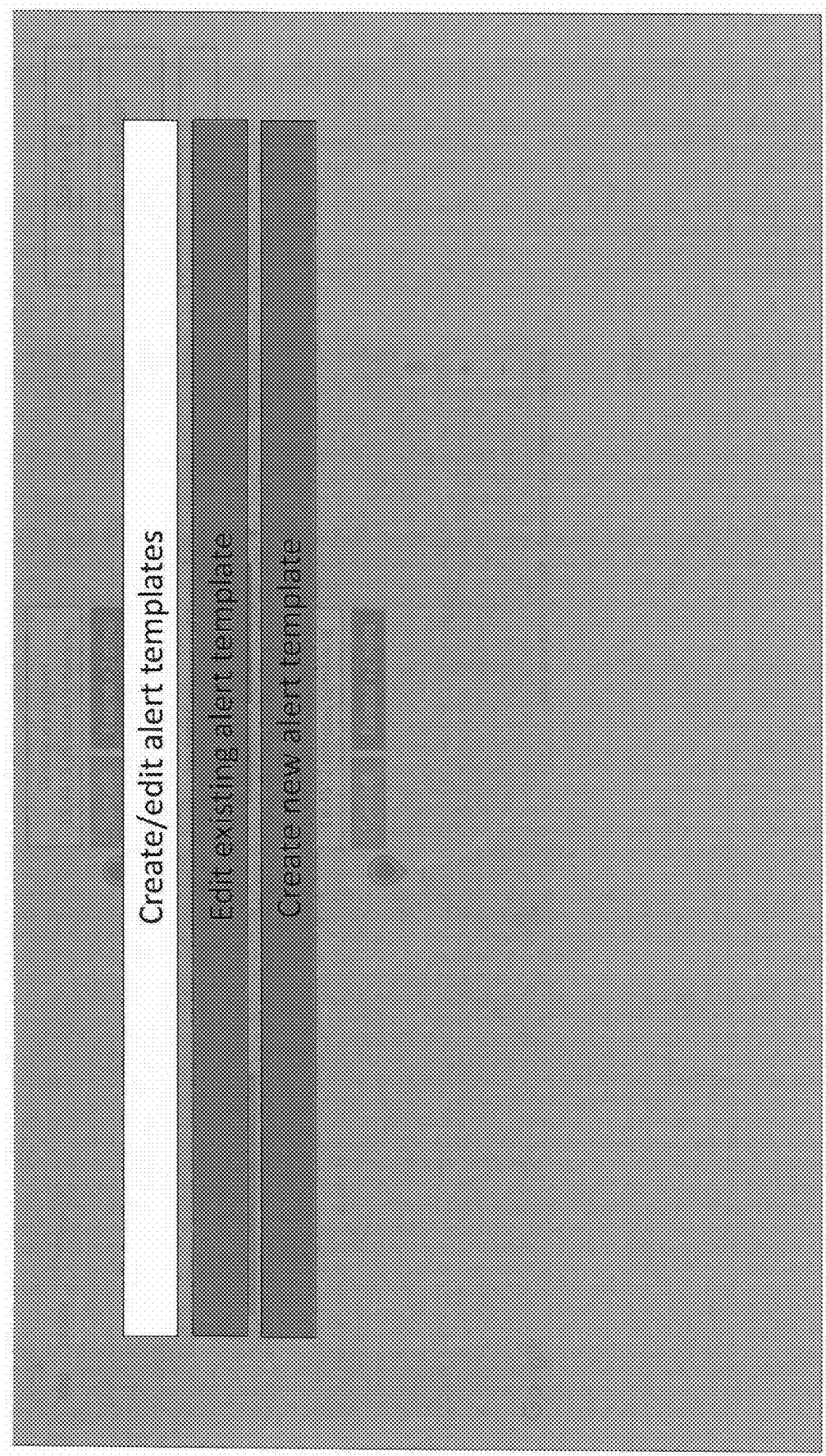
Figure 33:
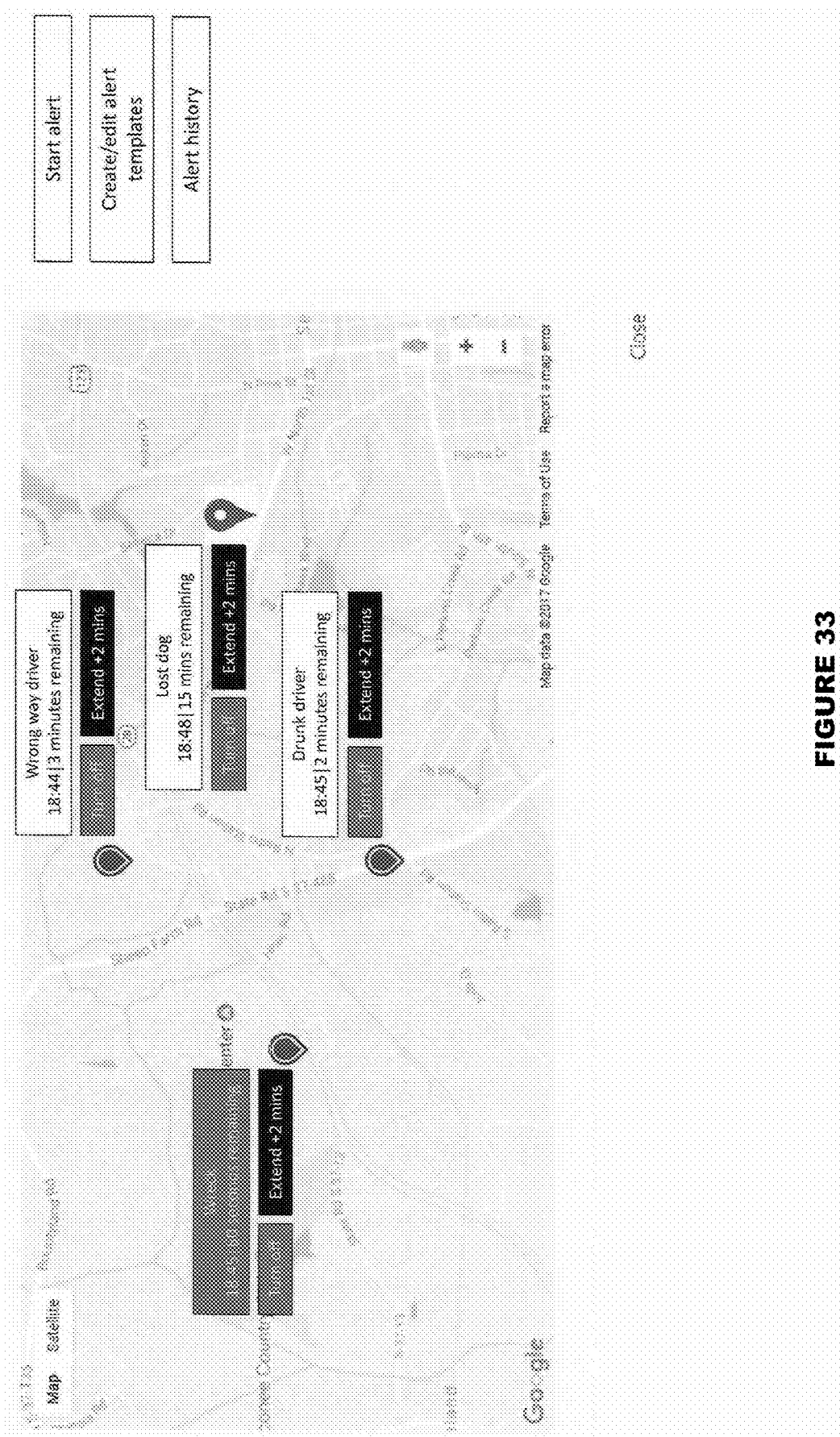

Now referring to FIG. 20, a system diagram illustrating the functions of the civilian application installed onto civilian operated personal electronic devices or civilian operated vehicle onboard processors. The civilian application computes whether or not to generate an alert to make the civilian aware that the civilian may be in imminent danger based on certain data pertaining to an imminent danger situation and the civilians proximity to the imminent danger situation through a given time interval.

This civilian application (2020) is installed onto civilian operated personal electronic devices or civilian operated vehicle onboard processors (2010) provided by the original manufacturer. The civilian application (2020) utilizes already existing components within the civilian operated personal electronic devices or civilian operated vehicle such as any plurality or combination thereof sensors arrays such as GPS and inertial sensors. Certain data pertaining to the civilian's arbitrary geographical location and motion (2030) and certain data transmitted from the tracking server pertaining to an imminent danger event (2040) are received by certain pieces of software (2050) contained within the civilian application (2020). As an imminent danger situation progresses, certain data pertaining to the civilian's arbitrary geographical location and motion (2030) and certain data transmitted from the tracking server pertaining to an imminent danger event (2040) are analyzed continuously using certain pieces of software to determine if the civilian is in imminent danger (2060) until the imminent danger situation is terminated. If certain pieces of software continuously determining if the civilian is in imminent danger (2060) determines that the civilian is in imminent danger, certain pieces of software generate notifications locally (2070) to make the civilian aware of the imminent danger. If certain pieces of software continuously determining if the civilian is in imminent danger (2060) determines that the civilian is not in imminent danger, certain pieces of software do not generate notifications (2071) but maintain the civilian application's activity in case an imminent danger situation comes into the general proximity of the civilian.

Figure 9:
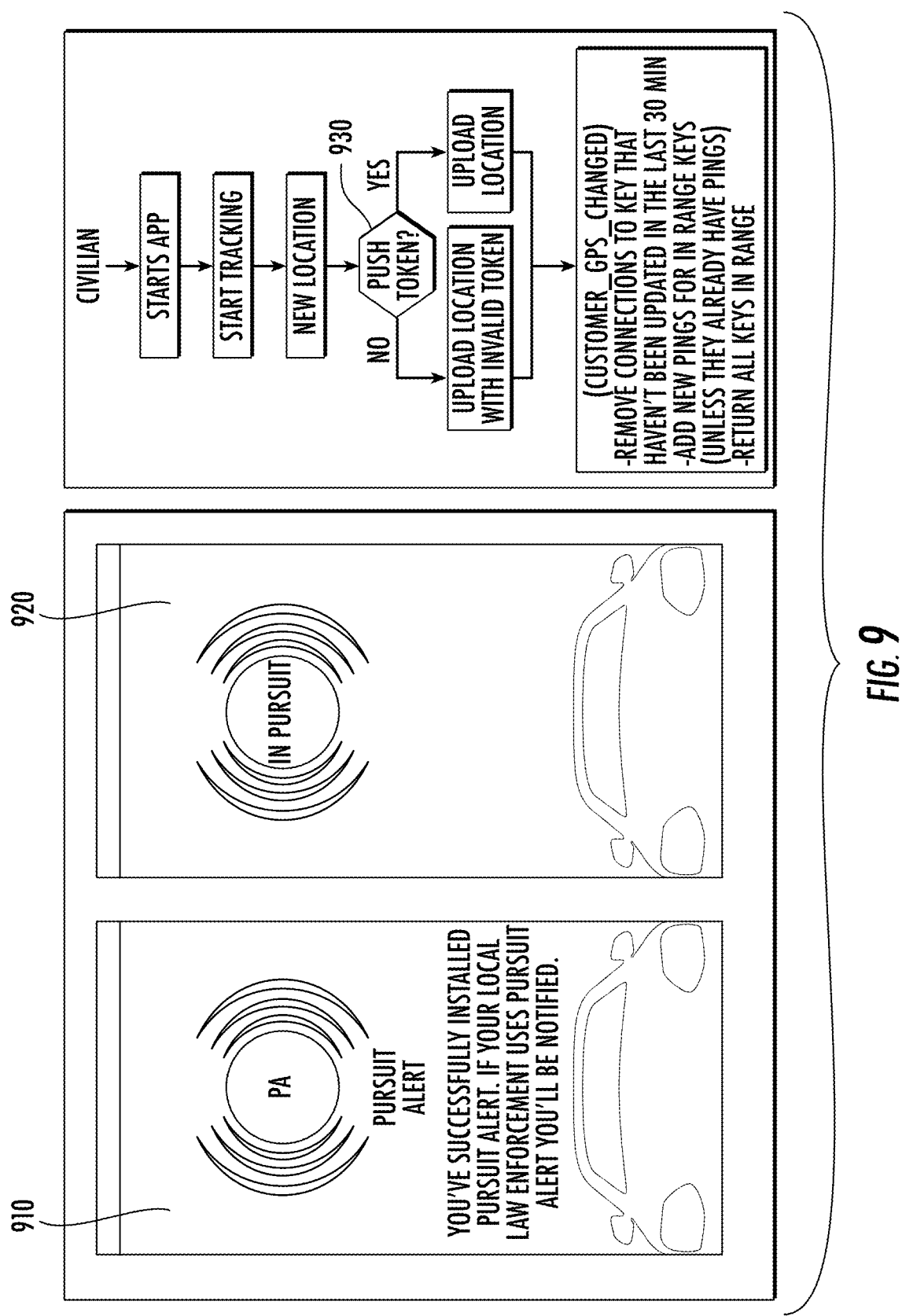
FIG. 9 Preferred embodiment of virtual civilian application installed on civilian operated PEDs.

Now referring to FIG. 9, diagrams of the civilian application guided user interface and software architecture installed onto civilian operated personal electronic devices. The introduction splash screen (910) appears on the device interface when the civilian application is first activated. After the application is done loading, the guided user interface screen (920) appears on the device interface. The software architecture (930) determines whether or not the civilian is in imminent danger or not by comparing certain data pertaining to the arbitrary geographical location and motion of the civilian and any government vehicles engaged in imminent danger situations.

Figure 10:
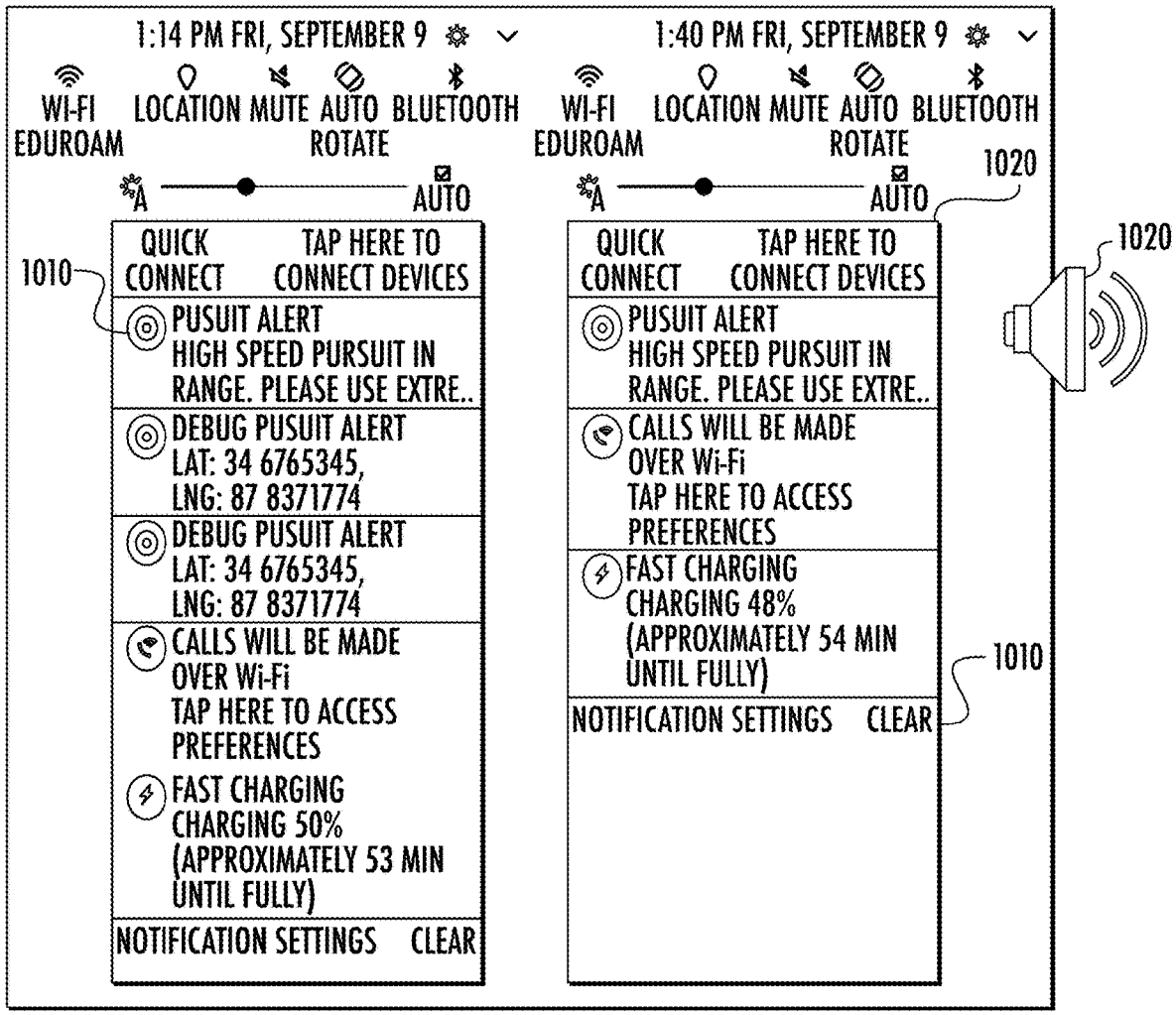
FIG. 10 Preferred embodiment of alert generation in virtual civilian application installed on civilian operated PEDs.

Now referring to FIG. 10, diagrams of notifications generated by the civilian application installed on civilian operated personal electronic devices. Notifications are intended to make the civilian aware of an imminent danger situation such that these civilians take the necessary precautions to stay out of harms way. Notifications are any plurality or combination thereof text alerts (i.e. push notification alerts, text messages, dialogue boxes, etc.) (1010, 1020), vibrational alerts (1030), or audio alerts (1040). These notifications (1010, 1020, 1030, 1040) can be of any combination thereof verbiage signifying a notification that makes a civilian aware that the civilian is within proximity to an imminent danger situation (1010) or if the civilian is no longer within proximity to an imminent danger situation (1020).

Figure 11:
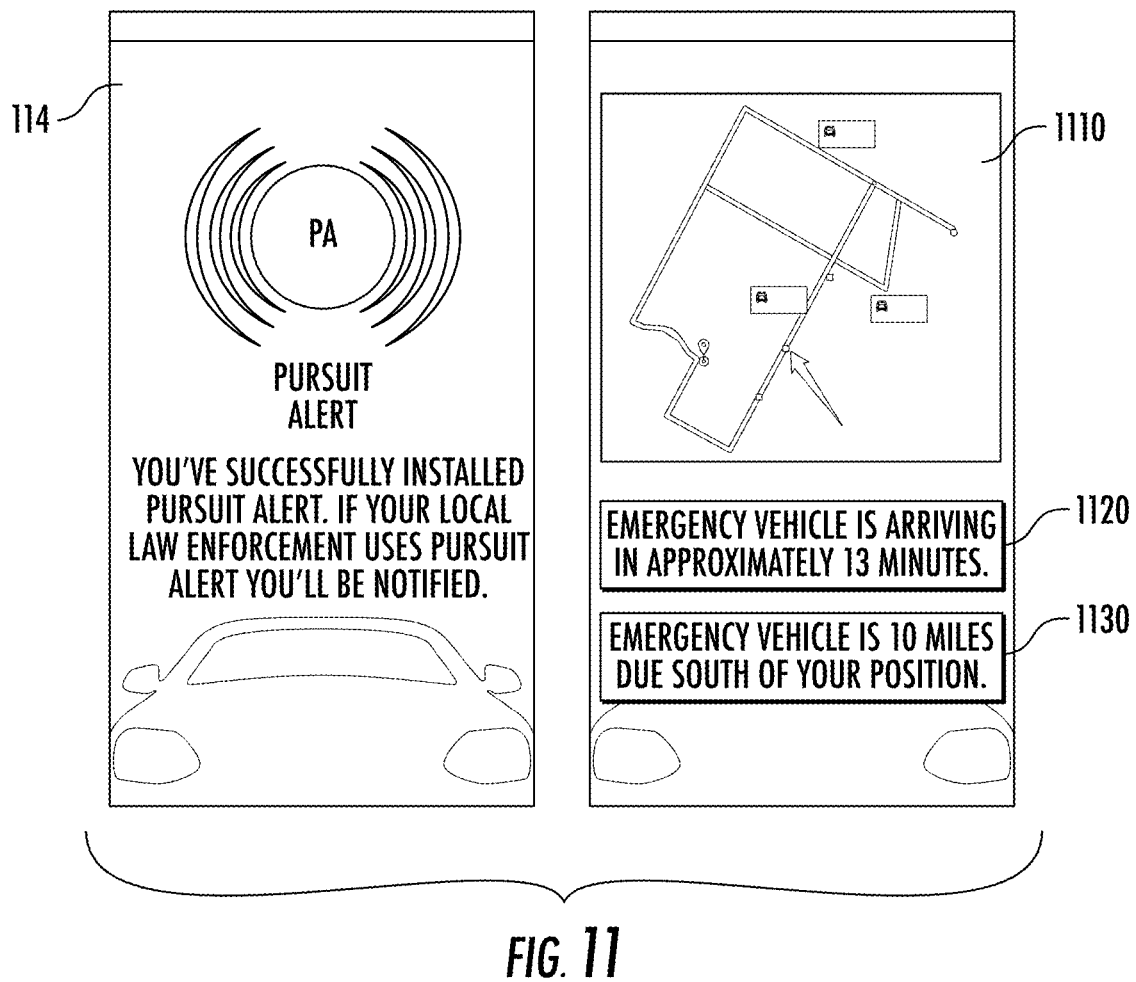
FIG. 11 Preferred embodiment of mapping functionality in virtual civilian application installed on civilian operated PEDs.

Now referring to FIG. 11, diagrams of additional mapping functionalities in the virtual civilian application installed on civilian personal electronic devices. The civilian application splash screen (1140) appears on the user interface of the personal electronic device as the civilian application loads. During certain active imminent danger situation (i.e. emergency response, fire, EMS, etc.), a mapping tool (1110) is displayed with details of an incoming government vehicle responding to an imminent danger event, Additionally, further details can be displayed in close proximity in virtual text fields in any combination thereof such as arbitrary estimated time of arrival (1120) and arbitrary geographical proximity (1130) to the civilian.

Figure 12:
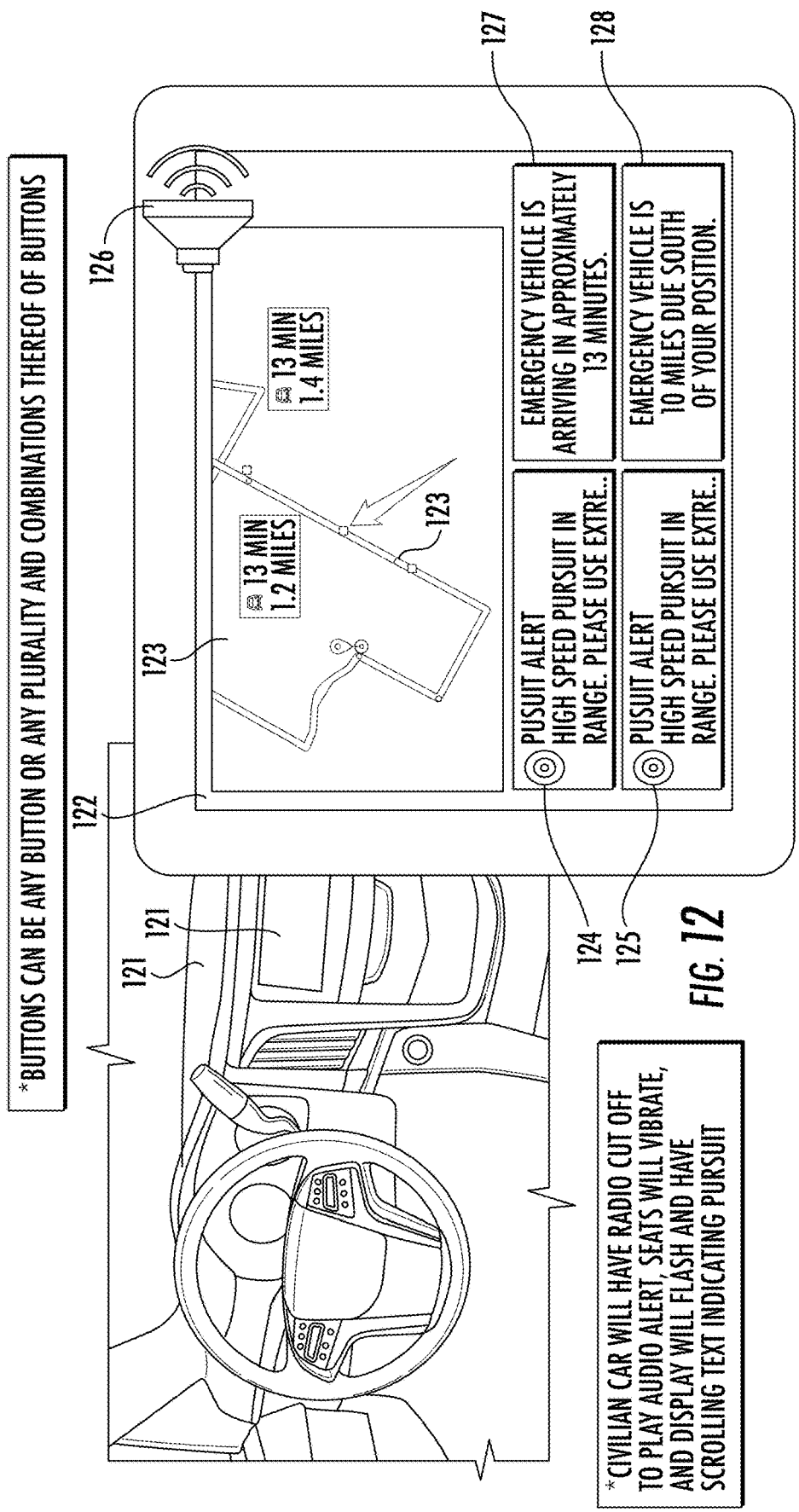
FIG. 12 Preferred embodiment of civilian application to be installed in civilian operated vehicles equipped with connected onboard computing platforms.

Now referring to FIG. 12, a diagram of the virtual civilian application to be installed in civilian operated vehicles. The civilian operator of a civilian operated vehicle interacts with the civilian application through a guided user interface (1215) already provided by an original equipment manufacturer of civilian operated vehicles in an arbitrary location that is located in close proximity (within reaching distance) of the civilian operator for easy access and operation. The civilian application guided user interface (1215) is secured into the dashboard or center console unit of government vehicles (1210) with some mechanical harness of arbitrary composite and geometry provided by the original equipment manufacturer of the civilian operated vehicle.

During an imminent danger situation, the civilian application screen (1220) automatically overrides the guided user interface (1215) inside the civilian operated vehicle. The civilian application screen (1220) begins to flash rhythmically to make the civilians within the vehicle aware of an imminent danger situation. The civilian application screen (1220) displays the default mapping functionality (1230) used by the civilian operated vehicle populated with arbitrary data pertaining to the geographical proximity of an imminent danger situation (1235). The civilian application screen (1220) also displays any plurality and combination thereof arbitrary visual notifications (1240, 1250, 1270, 1280) indicating if a civilian operated vehicle is in immediate imminent danger (1240), no longer in immediate imminent danger (1250), further details on government vehicle estimated time of arrival (1270) or proximity (1280). These notifications can also be played through the existing audio components in the vehicle creating an audio alert (1260) that overrides any other audio functions currently operating in the civilian vehicle.

*Seat and steering wheel vibrations

Now referring to FIG. 13, a diagram of the preferred embodiment of agency aggregate data overview guided user interface on web portal management system. The web portal management system is a secure, digitally accessible system, that is used to view certain data pertaining to imminent danger events for fleet management, reporting, and documentation purposes. The purpose of the agency aggregate data overview page, is intended for an agency administrator to quickly view overall agency activity.

Each agency has a separate data overview page allowing certain data pertaining to a particular agency to stay separated and not viewable to other agencies. These data overview pages branch off into separate branches to prevent any security breaches in data between agencies. This agency aggregate data overview page comprises of a list of all unique PursuitAlert™ console units or PursuitAlert™ government agent application users (1301) enrolled in a particular agency along with a plurality and any combination thereof corresponding metrics (1310) pertaining to government vehicle operator behavior, geographical location and motion of government vehicles, and notification generation during imminent danger events. Metrics can include:

Shift hours;
Number of pursuits within said shift;
Average pursuit distance;
Average top speed of each pursuit;
Map of the pursuit route;
Any marker dropped on the pursuit map;
Average number of said wireless devices receiving said emergency alerts;
GPS coordinates, and
Digital compass data.

Each aggregate data overview page for each agency also contains a set of features that allow for filtering and searching (1330, 1340) of specific data pertaining to one or any plurality of unique PursuitAlert™ console units or PursuitAlert™ government agent applications. These search functionalities and filters can search a specific time interval (1340) or these search functionalities and filters can search for a specific identifying attribute (1330) such as a specific PursuitAlert™ console units or PursuitAlert™ government agent applications, government vehicles involved only in imminent danger events, or a specific government operator or any combination thereof.

Each aggregate data overview page for each agency also contains a virtual export button (1340) which can export any searched or filtered data into a downloadable file for reporting or documentation purposes.

Figure 18:
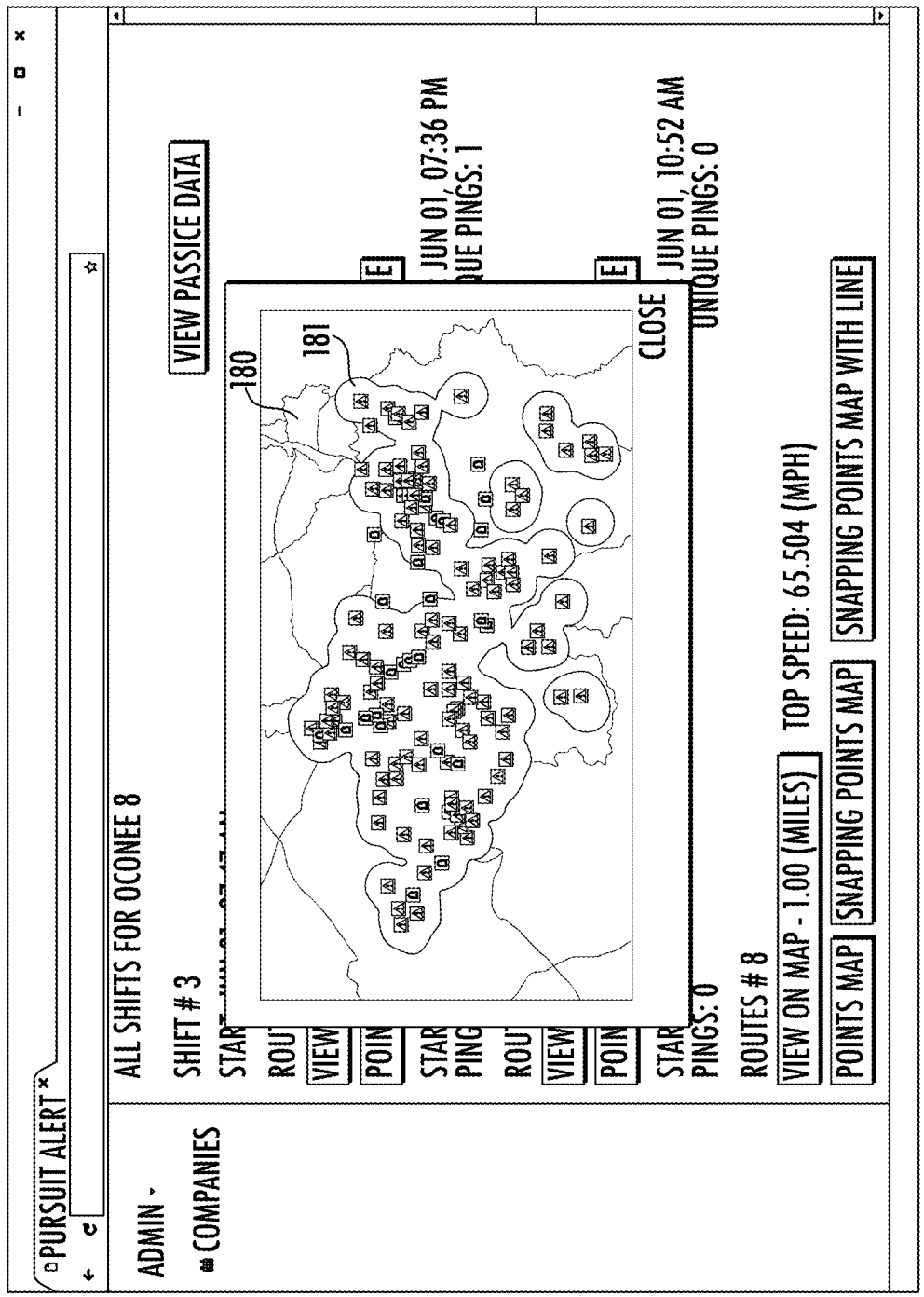
FIG. 18 Preferred embodiment of aggregate agency passive patrol data viewing guided user interface on web portal management system.

Each aggregate data overview page also contains a virtual button (1360) that activates a function that allows a system administrator to view all passive activity from a fleet of government vehicles enrolled under each agency. Further details on viewing passive activity are illustrated in FIG. 18.

Figure 19:
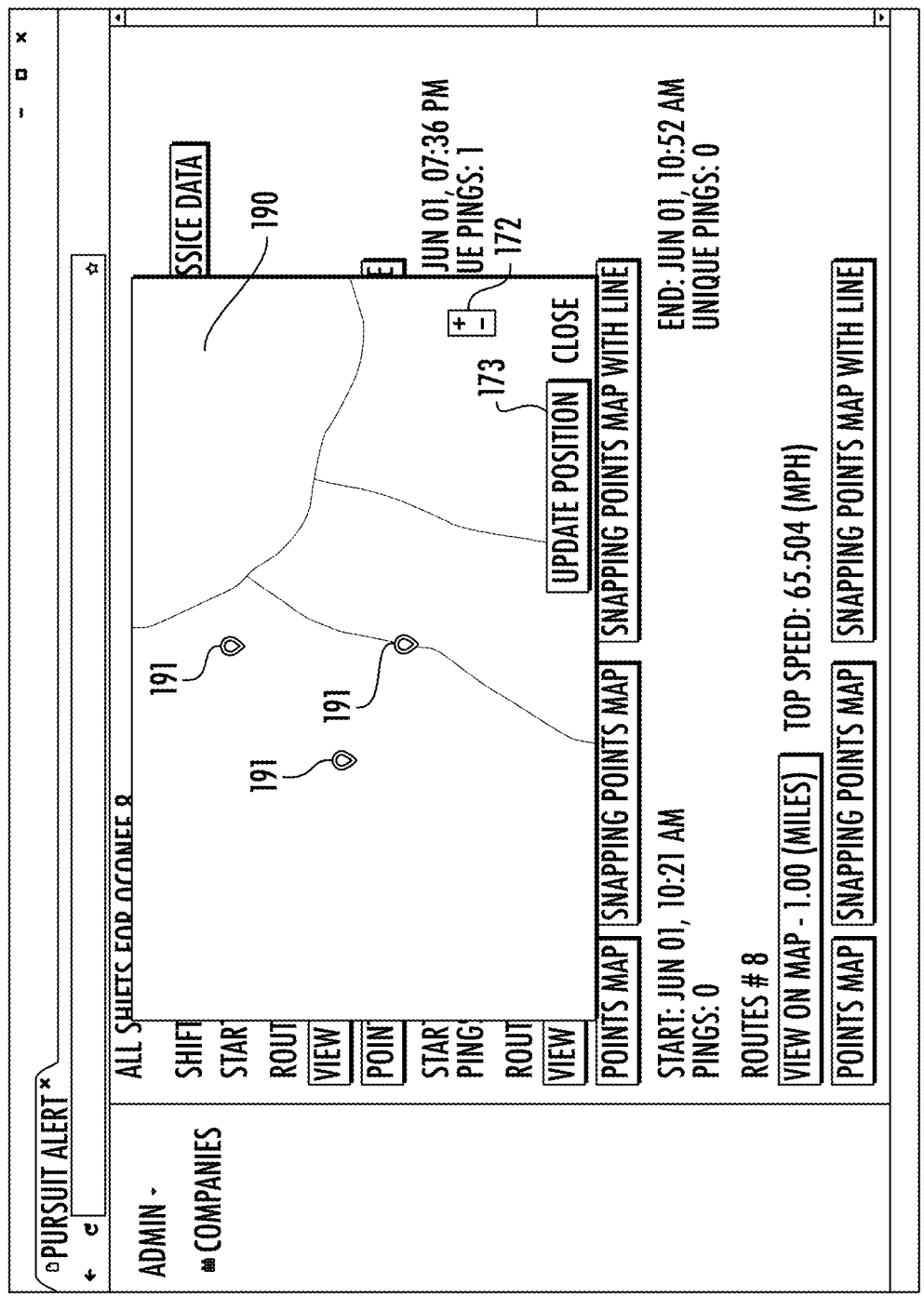
FIG. 19 Preferred embodiment of fleet locator guided user interface on web portal management system.

Each aggregate data overview page also contains a virtual button (1350) that activates a function that allows a system administrator to view the most recent locations of each individual government vehicle outfitted with a PursuitAlert™ console unit or PursuitAlert™ government agent application. Further details on this function are illustrated in FIG. 19.

Each aggregate data overview page for each agency also contains a virtual button (1335) which allows viewing of certain specific data for an individual government vehicle outfitted with a PursuitAlert™ console unit or PursuitAlert™ government agent application categorized by power on and off events of the PursuitAlert™ console unit or PursuitAlert™ government agent application. Further details on viewing individual government vehicle outfitted with a PursuitAlert™ console unit or PursuitAlert™ government agent application are illustrated in FIG. 14-17.

Now referring to FIG. 14, a diagram depicting the event by event overview on the web portal management system. When a user activates the virtual button in (FIG. 13 1335), a page or populated list of certain data pertaining to an individual government vehicle's individual intervals of use defined as the time interval between a power on event and power off event. These certain data can include any plurality or combination thereof:

Shift hours;
Number of pursuits within said shift;
Average pursuit distance;
Average top speed of each pursuit;
Map of the pursuit route;
Any marker dropped on the pursuit map;
Average number of said wireless devices receiving said emergency alerts;
GPS coordinates, and
Digital compass data.

Individual shifts that an imminent danger event occurred in (1420) are highlighted to make those shifts visually apparent to the user. Virtually interacting with the details button (1410) allows viewing of certain data pertaining to imminent danger events. Further details describing specific details viewing of an imminent danger event on the web portal management system are illustrated in FIG. 15.

Figure 15:
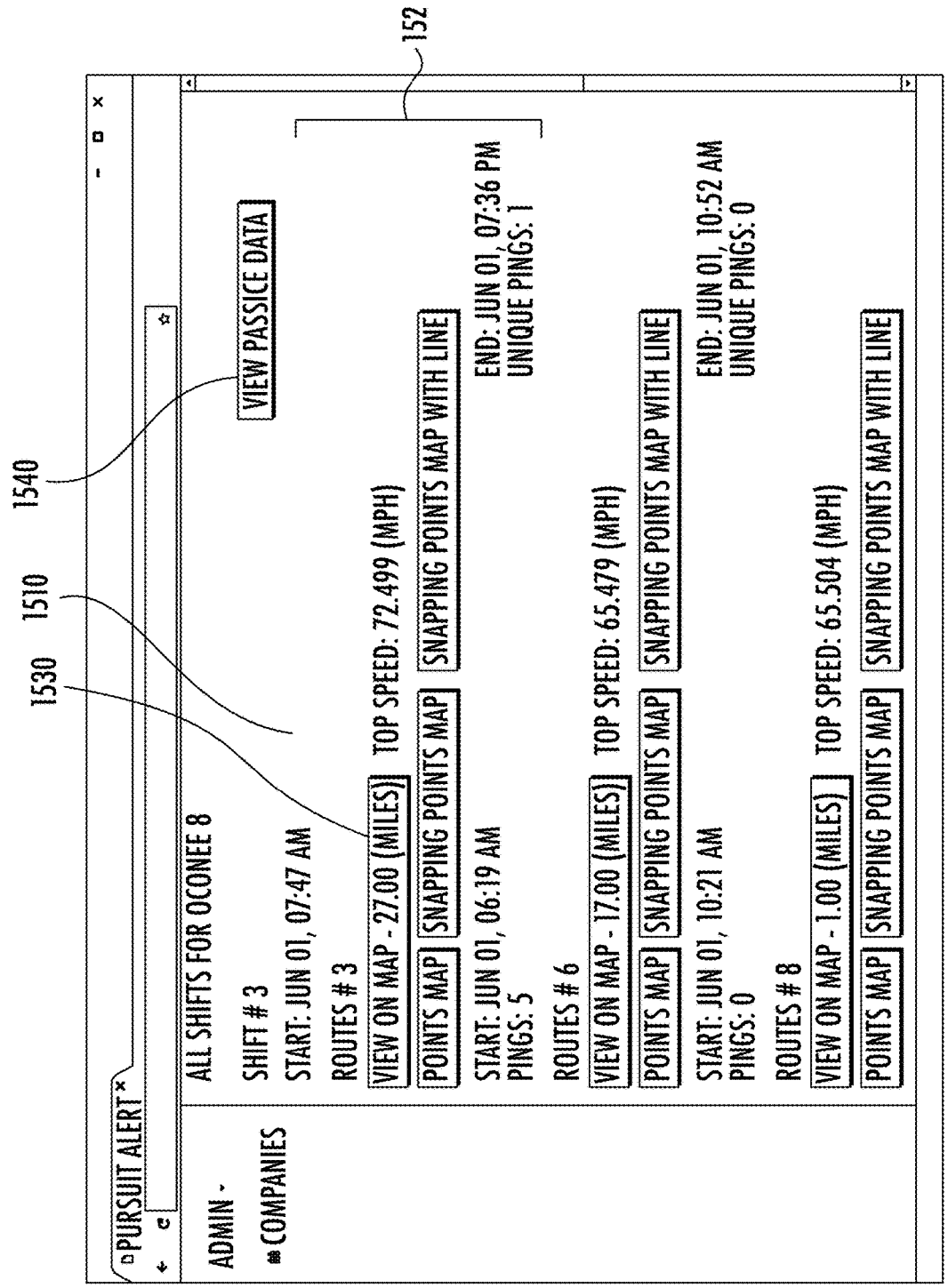
FIG. 15 Preferred embodiment of individual event details guided user interface on the web portal management system.

Now referring to FIG. 15, a diagram depicting individual shift details guided user interface on the web portal management system. This guided, user interface is intended to allow the user to view certain data pertaining to the behavior of the operator of a government vehicle during an imminent danger event, the motion and geographical location of the government vehicle during an imminent, danger event (such as speed and maps of routes taken by the government vehicle), and the number of notifications sent to civilians during an imminent danger event. These details are displayed (1520) on the guided user interface in an arbitrary orientation along with the start and end time indications of the shift (1510). Within this guided user interface, a virtual button (1530) activates a mapping function that allows the user to view the maps of routes taken by the government vehicles during an imminent danger event. Further details of individual imminent danger event mapping are illustrated in FIG. 16.

Also within this guided user interface, a virtual button (1540) activates a mapping function that allows the user to view the passive activity of the government vehicle at any point in which the government vehicle is not engaged in an active imminent danger event. Further details of individual government vehicle passive activity mapping are illustrated in FIG. 17.

Figure 16:
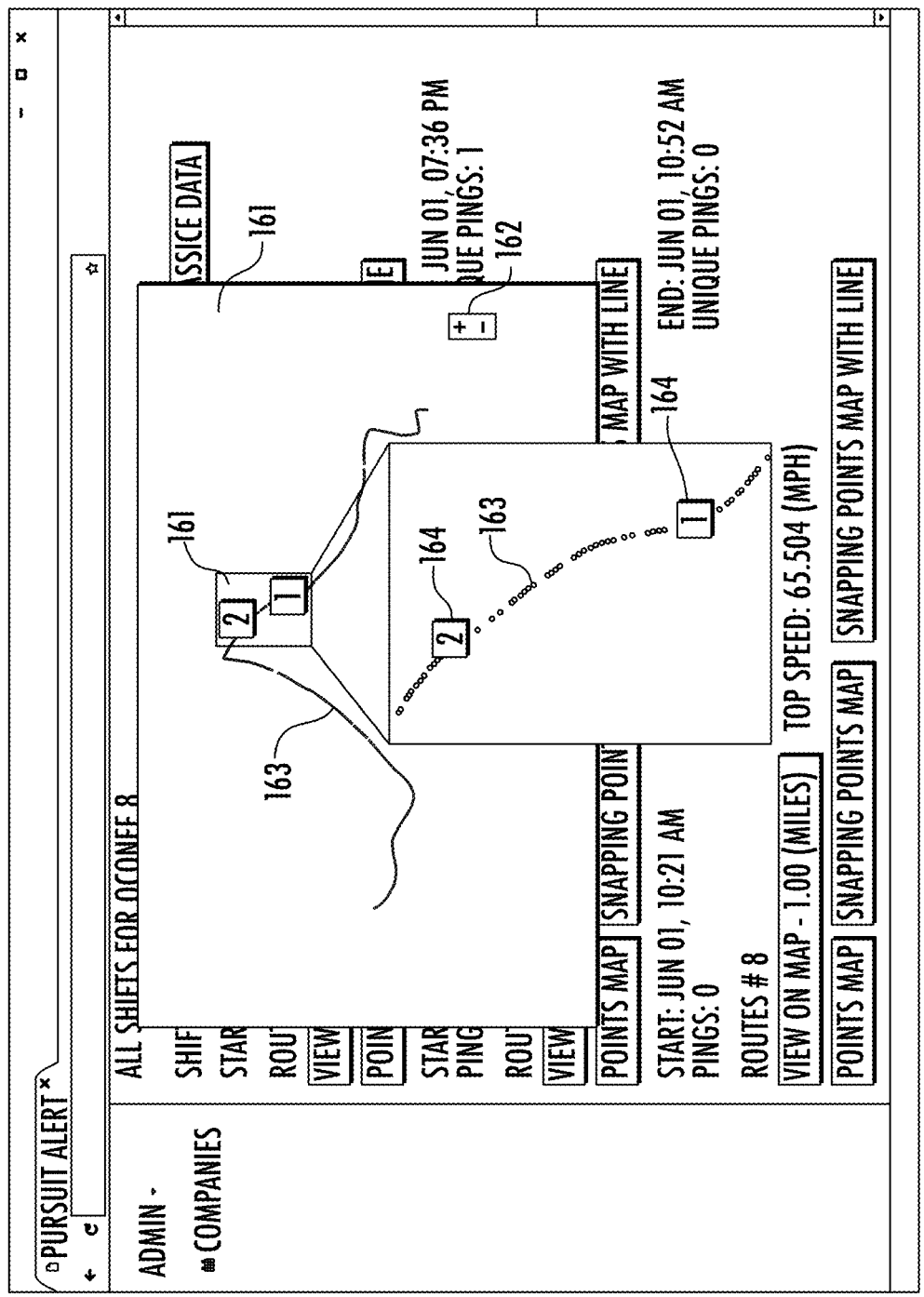
FIG. 16 Preferred embodiment of event map viewing guided user interface on web portal management system.

Now referring to FIG. 16, a depiction of individual imminent danger event map viewing guided user interface on web portal management system. This mapping functionality is enabled by the user interfacing and activating the virtual button in FIG. 15 (1530). Upon interacting with virtual button (1530), a virtual map pop-up page (1610) is populated with any plurality or combination of points or indicative markers denoting a path of travel (1630) of arbitrary geolocations labeled with arbitrary time stamps. This virtual map pop-up page (1610) can be panned or adjusted for viewable area via interaction with the virtual toggle features (1620).

The inset in FIG. 16 (1615) depicts a zoomed in portion of the route (1630) that illustrates labeling of one or any plurality of particular geolocations of arbitrary interest (1640) recorded by the operator of the government vehicle through the PursuitAlert™ console unit or PursuitAlert™ government agent application. For further details on the PursuitAlert™ console unit, refer to FIGS. 3 and 4. For further details on the PursuitAlert government agent application, refer to FIGS. 5 and 6.

Figure 17:
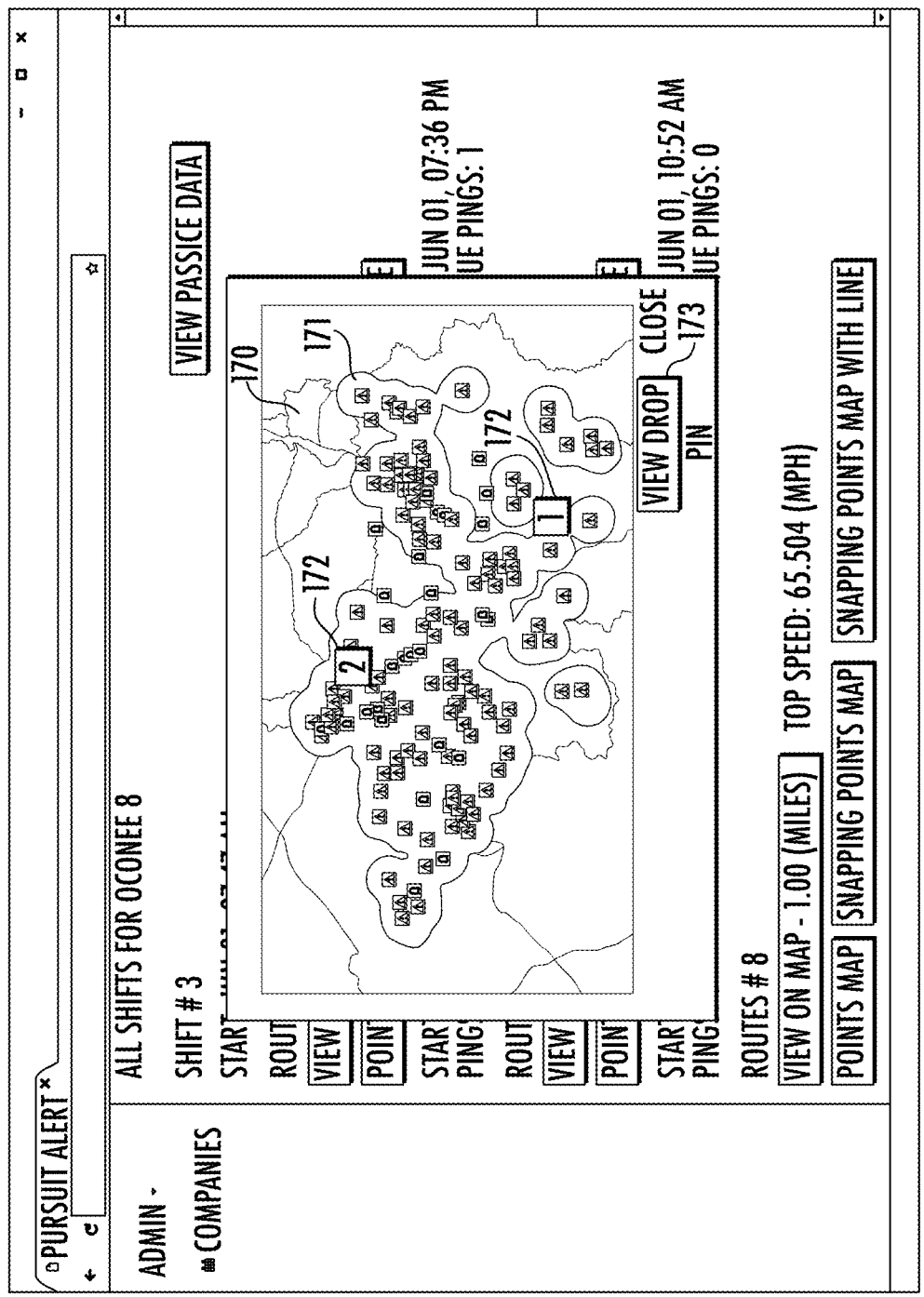
FIG. 17 Preferred embodiment of passive activity viewing of government vehicle(s) guided user interface on web portal management system.

Now referring to FIG. 17, a depiction of passive activity viewing of a government vehicle guided user interface on web portal management system. One or any plurality of arbitrary geographical locations of interest are recorded and transmitted using the PursuitAlert™ console unit (FIGS. 3 and 4) or PursuitAlert™ government agent application (FIGS. 5 and 6) for storage in the cloud server infrastructure (FIG. 8). These arbitrary geographical locations of interest are populated on a virtual map pop-up page (1701). High density regions of these arbitrary points of interest are color coded one color and other low density regions are color coded another color creating a spectrum of colors corresponding to densities of arbitrary points of interest (1710). Furthermore, one or any plurality of points of geographical interest actively recorded by the operator of a government vehicle (1720) are populated on the virtual map pop-up page (1701). These points of geographical interest actively recorded by the operator of a government vehicle (1720) can be virtually toggled off and on with user interaction with a virtual button (1730). For further details on passive activity detection on the PursuitAlert™ console unit, refer to FIGS. 3 and 4. For further details on the passive activity detection on the PursuitAlert™ government agent application, refer to FIGS. 5 and 6.

Now referring to FIG. 18, a depiction of aggregate passive activity viewing of all government vehicles enrolled under one agency. The aggregate passive activity viewing is activated when the user interacts with the virtual button in FIG. 13 (1360). Interacting with the virtual button in FIG. 13 (1360) initiates a virtual map pop-up (1801). Aggregation of passive activity is a collection of certain data pertaining to one or any plurality of government vehicles' arbitrary geographical location or motion through some arbitrary time interval (1810) of the user's choosing on a virtual map pop-up (1801). High density regions of these arbitrary points of interest are color coded one color and other low density regions are color coded another color creating a spectrum of colors corresponding to densities of arbitrary points of interest (1810). For further details on passive activity detection on the PursuitAlert™ console unit, refer to FIGS. 3 and 4. For further details on the passive activity detection on the PursuitAlert™ government agent application, refer to FIGS. 5 and 6.

Now referring to FIG. 19, a depiction of the fleet locator user interface on the web portal management system. The fleet locator user interface is activated when a user interacts with the virtual button (1350) in FIG. 13. Upon activation of the virtual button (1350) in FIG. 13, a virtual map pop-up (1901) populates with one or any plurality of arbitrary marking indicators of the arbitrary geographical locations of all government vehicles enrolled under one agency. 911 call centers receive reports about adverse events that pose a risk to civilians in the public space frequently (i.e. drunk driver, wrong way driver, adverse weather conditions, car wreck, loose dog, child missing, etc.). They currently contact law enforcement agents to report to the location of the incident and follow standard operating procedures to mitigate risk to the public. However, during that response time, the danger of the adverse event is still not known to civilians in the public space. This is specifically dangerous for unsuspecting drivers that can be driving into active danger. Therefore, this system has been designed to provide a digital alert to these civilians that may be in danger.

An additional embodiment of the present invention involves using similar technology and components to allow a 911 call operator to send out alerts of emergency safety events, such events and processes being similar to that in the prior embodiments described herein, such that the alerts go to a PED of a civilian.

FIGS. 21 through 33 are sample maps featuring drop pins and information that can be displayed as part of an emergency signal process provided to a 911 operator.

FIG. 34 is a representative 911 operator log that shows a history of emergency events.

This system comprises of a web portal dashboard, a server, backend, and a digital application that, can be installed on a civilian's smart devices. This web portal dashboard contains a user interface comprising of a map and buttons with various functions that are used to demark a location of an adverse event (i.e. wrong way driver, drunk driver, adverse weather event such as flooding, wreck, hazardous conditions, missing dog/child, etc.) that may pose danger to the public and send out a digital alert to civilian via digital connected technology to the civilians' smart devices (android, iOS, in vehicle computers, etc.). These alerts are received by civilians that are inside of a determined radius that is set, by the user upon alert activation (default radius is preset by the 911 call center in their standard operating procedures). These alerts are also customizable to the nature of the adverse event. Based on the nature of the event, customizable text may accompany the digital alert sent out to smart devices, alert sounds/tones, alert duration, and alert radii.

To activate an alert to be sent out, a user (certified operator in a 911 call center) logs into a web portal dashboard. The user clicks on a button to declare that the operator requires starting an alert. The user is then prompted to click on the location of the adverse event on the map. After clicking on this map, a marker/pin locator appears on the map and the user will choose a preset alert or create a custom alert. A user can create a custom alert by selecting the custom, alert button and using the interface to enter in a short message for civilians to read, alert radius, alert duration, and alert audible tone. The user can then save this custom alert as a preset alert and name it for future use. The user is then prompted to confirm sending out the selected alert. Once confirmed, civilians with a smart device within the preset radius receive an alert with the preset text and audible tone for a preset duration.

Other users can access the same web portal dashboard to activate new alerts or interact and change current live alerts that are ongoing. Each user has their own login account and can terminate existing alerts or extend the alert durations as needed. The system logs all actions taken by users and records it in a comprehensive history. This history can be accessed by clicking the history of alerts button. This brings the user to a new page with a listing of all alerts within some preset duration (i.e. 30 days). The user can use various filters on this page to more efficiently search and compile data for reporting or prosecution purposes (i.e. search by preset alert type, duration, time of alert, user, etc.). For each data entry line in this comprehensive list, basic statistics are shown of every alert sent out (i.e. alert type, start/stop alert time, duration, civilians notified, and user actions with time stamps, etc.).

Alerts can be very limited in geographic territory such as a disabled car on an interstate, lane closure, and can include text based or audio components such as advising citizens to use alternative routes or to expect travel delays, including travel direction impacts of interstate in other multi lane roads. Location maps can also be included in, the alert notifications.

While many of the alerts will be sent out based upon a radius of the event, is also possible to customize the shape and geographic scope of the alert. For instance, an alert based upon interstate travel conditions could extend for many miles along the length of the impacted interstate yet extend a relatively smaller distance width-wise to alert drivers who may be approaching an entrance to the interstate alert zone.

The 911 alert operator notifications can also be used to supplement distribution of amber alerts, silver alerts, and similar broadcast alerts. Addition, the system can be designed to interface with DOT warning signs that are frequently positioned on interstates.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

The invention claimed is:

1. A method of communicating an alert from an emergency vehicle to a personal electronic device (PED) comprising the steps of:
    providing a signaling device within an emergency vehicle, the signaling device optionally having a plurality of emergency event settings selecting from the group consisting of Police pursuit, fire emergency vehicle, ambulance, emergency road closure, emergency lockdown modes and combinations thereof;
    transmitting a signal from the signaling device to a PED, the PED being one of a mobile phone or a dedicated receiving unit within one of an automotive vehicle, a business, or a residence, the signal providing notification of an emergency event, and wherein the step of transmitting a signal utilizes a recognition step of an applicable PED based upon GPS, geo-fencing, or smart phone location services the PED providing an alert to individuals in communication with the PED;
    limiting the transmitting step to a PED or receiving unit within a predetermined location in proximity to the signaling device, the predetermined location being dependent upon the type of emergency event;
    allowing the operator of the PED to have one or more event settings disabled;
    allowing the operator of the PED to disable an event setting within a defined geographic area;
    repeating the transmitting step on a regular interval and adjusting the recipients of the transmitted signal based upon either a change of location of the signaling device or a change of location of the PED to a location outside the predetermined location;
    additionally notifying prior recipients of an alert that the recipient is no longer in the predetermined alert location; and transmitting an "all clear" message to the most recent grouping of alert recipients that the alert is cancelled.

2. The method of claim 1 wherein the predetermined location is determined in part by factors of vehicle density, time of day, population density, emergency vehicle path, and emergency vehicle direction of travel.

3. The method of claim 1 wherein when the receiving unit is in a building, an audible recorded alert is broadcast within the building.

4. The method according to claim 1 wherein an operator of an emergency vehicle can provide an evacuation alert to the receiving units.

5. The method according to claim 4 wherein the emergency event is customized based upon zones of flooding, dam breach, industrial site emergency, chemical spill, tornado, active shooter, wildfire, tsunami, or hurricane.

6. The method according to claim 1 wherein the step of transmitting of an alert signal provides the additional step of transmitting to a PED additional information from the emergency vehicle including location, direction of travel, speed of travel, and mapping location onto a displayed map.

7. The method according to claim 6 wherein the mapping location can include additional information of location of additional emergency vehicles in the area.

8. The method according to claim 1 wherein the notification signal can be one or, more of the signals from the group consisting of a tone alert from the PED, a vibration of the RED, a screen display warning on the PED, a warning generated by an audio system of a car, a visual car display screen, vibration alert of a steering wheel or seat, and combinations thereof.

9. The method according to claim 1 including the additional steps of transmitting a signal from the signaling device to a server, the server collecting data regarding details of the emergency event including; shift hours for the operator of the emergency vehicle activating the signaling device; number of pursuits within a working; shift: an average pursuit distance per emergency event; a top speed of an emergency vehicle responding to an emergency event; a map of the pursuit route for each emergency event; marker pins dropped by an operator of the emergency vehicle during an emergency event; the number of PEDs receiving any one emergency event; and, GPS coordinates associated with the emergency vehicle location for each emergency event.

10. The method according to claim 1 wherein, the notification signal is one of a vibration alert on, one of either a steering wheel or an automotive seat.

11. The process according to claim 1 wherein said step of transmitting a signal on the signaling device additionally includes transmitting the signal to a remote server; and, transmitting from the server to the emergency vehicle location information on other emergency vehicles responding to the alert.

12. A method of communicating an alert from an emergency vehicle to a personal electronic device (PED) comprising the steps of:

providing a signaling device within an emergency vehicle, the signaling device optionally having a plurality of emergency event settings selecting from the group consisting of Police pursuit, fire emergency vehicle, ambulance, emergency road closure, emergency lockdown modes and combinations thereof, the signaling device being in further communication with a server programmed to gather data regarding an emergency event provided by the signaling device, the data comprising: shift hour; number of pursuits within a shift;

average pursuit distance; average speed of a pursuit;

maximum top speed of a pursuit;

map of the pursuit route;

marker pins deployed, during a pursuit; number of PEDs receiving a signal from the signaling device; and GPS coordinates; transmitting a signal from the signaling device to a PED, the PED being one of a mobile phone or a dedicated receiving unit within one of an automotive vehicle, a business, or a residence, the signal providing notification of an emergency event, the PED providing an alert to individuals in communication with the PED; and wherein the step of transmitting a signal utilizes a recognition step of an applicable PED based upon GPS, geo-fencing, or smart phone location services the PED providing an alert to individuals in communication with the PED;

limiting the transmitting step to a PED or receiving unit within a predetermined location in proximity to, the signaling device, the predetermined location being dependent upon the type of emergency event;

allowing the operator of the PED to have one or more event settings disabled;

allowing the operator of the PED to disable an event setting within a defined geographic area;

repeating the transmitting step on a regular interval and adjusting the recipients of the transmitted signal based upon a change of location of the signaling device;

additionally, notifying prior recipients of an alert that the recipient is no longer in the predetermined alert location; and transmitting an "all clear" message to the most recent grouping of alert recipients that the alert is cancelled.

* * * * *